US011528757B2

(12) United States Patent
Landis et al.

(10) Patent No.: US 11,528,757 B2
(45) Date of Patent: Dec. 13, 2022

(54) DYNAMIC CYCLIC PREFIX SELECTION

(71) Applicant: QUALCOMM Incorporated, San Diego, CA (US)

(72) Inventors: Shay Landis, Hod Hasharon (IL); Assaf Touboul, Netanya (IL); Ran Berliner, Kfar-Aviv (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/085,759

(22) Filed: Oct. 30, 2020

(65) Prior Publication Data

US 2022/0141889 A1    May 5, 2022

(51) Int. Cl.
| | |
|---|---|
| H04W 76/10 | (2018.01) |
| H04L 27/26 | (2006.01) |
| H04W 24/10 | (2009.01) |
| H04W 24/08 | (2009.01) |
| H04L 5/00 | (2006.01) |
| H04W 72/04 | (2009.01) |

(52) U.S. Cl.
CPC .......... *H04W 76/10* (2018.02); *H04L 5/0048* (2013.01); *H04L 27/2605* (2013.01); *H04W 24/08* (2013.01); *H04W 24/10* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2013/0022090 A1* | 1/2013 | Weng | H04L 27/2607 375/260 |
| 2016/0149743 A1* | 5/2016 | Rong | H04B 7/0452 370/329 |
| 2018/0091267 A1* | 3/2018 | Kim | H04L 5/0007 |
| 2019/0081832 A1* | 3/2019 | Marinier | H04L 5/0007 |
| 2020/0235887 A1* | 7/2020 | Hou | H04L 5/0007 |
| 2020/0374067 A1* | 11/2020 | Vieira | H04L 27/261 |

FOREIGN PATENT DOCUMENTS

GB          2550581 A  * 11/2017  ........... H04B 17/336

* cited by examiner

*Primary Examiner* — Diane L Lo
(74) *Attorney, Agent, or Firm* — Holland & Hart LLP

(57) ABSTRACT

Methods, systems, and devices for wireless communications are described for reducing overhead associated with a cyclic prefix (CP) by supporting dynamic determination of a CP length. For example, a user equipment (UE) may establish a wireless connection with a base station by receiving initial communications according to a numerology and a first CP configuration associated with a first CP length. The UE may determine a second CP length after establishing the wireless connection and may transmit an indication to the base station, indicating the second CP length. The base station may receive the indication and may transmit downlink signals according to a second CP configuration associated with the second CP length. The initial communications and the downlink signals may be associated with a same numerology or subcarrier spacing.

30 Claims, 16 Drawing Sheets

DYNAMIC CYCLIC PREFIX SELECTION

FIELD OF TECHNOLOGY

The present disclosure relates to wireless communications, including dynamic cyclic prefix selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some channel or environmental conditions experienced by a UE may result in interference for wireless communications at the UE. Communications overhead may increase when employing various techniques to reduce the interference.

SUMMARY

The described techniques relate to improved methods, systems, devices, and apparatuses that support dynamic cyclic prefix (CP) selection. Generally, the described techniques provide for reducing overhead associated with a CP by supporting dynamic determination of a CP length. For example, a user equipment (UE) may establish a wireless connection with a base station by receiving initial communications according to a first numerology and a first CP configuration associated with a first CP length. The UE may determine a second CP length after establishing the wireless connection and may transmit an indication to the base station, indicating the second CP length. The base station may receive the indication and may transmit downlink signals according to a second CP configuration associated with the second CP length. The initial communications and the downlink signals may be associated with a same numerology or subcarrier spacing, such that the second CP length may be associated with the first numerology.

A method of wireless communication at a UE is described. The method may include establishing a wireless connection with a base station, communicating with the base station on the wireless connection using a numerology and a first CP configuration associated with a first CP length, determining a second CP length for the numerology based on channel quality information for the wireless connection, transmitting, to the base station, an indication of the second CP length, and receiving, based on transmitting the indication, downlink signals from the base station on the wireless connection using the numerology according to a second CP configuration associated with the second CP length.

An apparatus for wireless communication at a UE is described. The apparatus may include a processor, memory coupled with the processor, and instructions stored in the memory. The instructions may be executable by the processor to cause the apparatus to establish a wireless connection with a base station, communicate with the base station on the wireless connection using a numerology and a first CP configuration associated with a first CP length, determine a second CP length for the numerology based on channel quality information for the wireless connection, transmit, to the base station, an indication of the second CP length, and receive, based on transmitting the indication, downlink signals from the base station on the wireless connection using the numerology according to a second CP configuration associated with the second CP length.

Another apparatus for wireless communication at a UE is described. The apparatus may include means for establishing a wireless connection with a base station, communicating with the base station on the wireless connection using a numerology and a first CP configuration associated with a first CP length, determining a second CP length for the numerology based on channel quality information for the wireless connection, transmitting, to the base station, an indication of the second CP length, and receiving, based on transmitting the indication, downlink signals from the base station on the wireless connection using the numerology according to a second CP configuration associated with the second CP length.

A non-transitory computer-readable medium storing code for wireless communication at a UE is described. The code may include instructions executable by a processor to establish a wireless connection with a base station, communicate with the base station on the wireless connection using a numerology and a first CP configuration associated with a first CP length, determine a second CP length for the numerology based on channel quality information for the wireless connection, transmit, to the base station, an indication of the second CP length, and receive, based on transmitting the indication, downlink signals from the base station on the wireless connection using the numerology according to a second CP configuration associated with the second CP length.

In some examples of the method, apparatuses, and non-transitory computer-readable medium described herein, transmitting the indication may include operations, features, means, or instructions for transmitting the indication in a channel state information (CSI) report, or a beam management report, or a report different from the CSI report and the beam management report, or any combination thereof.

Some examples of the method, apparatuses, and non-transitory computer-readable medium described herein may further include operations, features, means, or instructions for determining that a first time period for the first CP configuration may have elapsed before determining to receive the downlink signals from the base station according to the second CP configuration.

Some examples of the method, apparatuses, and non-transitory computer-readable medium described herein may further include operations, features, means, or instructions for starting a timer based on transmitting the indication of the second CP length, where determining that the first time period may have elapsed may be based on starting the timer.

In some examples of the method, apparatuses, and non-transitory computer-readable medium described herein, determining the second CP length may include operations, features, means, or instructions for selecting the second CP length from a set of CP lengths configured at the UE.

Some examples of the method, apparatuses, and non-transitory computer-readable medium described herein may further include operations, features, means, or instructions for receiving, from the base station, a configuration indicating the set of CP lengths, where selecting the second CP length from the set of CP lengths may be based on the configuration indicating the set of CP lengths.

Some examples of the method, apparatuses, and non-transitory computer-readable medium described herein may further include operations, features, means, or instructions for receiving, from the base station at least in part in response to the indication of the second CP length, an acknowledgement of the second CP length for the downlink signals from the base station.

In some examples of the method, apparatuses, and non-transitory computer-readable medium described herein, determining the second CP length may include operations, features, means, or instructions for determining a channel impulse response associated with the wireless connection based on one or more measurements of signals received on the wireless connection, determining a delay spread associated with the wireless connection based on the channel impulse response, the channel quality information including the delay spread, and setting the second CP length to be greater than or equal to the delay spread.

In some examples of the method, apparatuses, and non-transitory computer-readable medium described herein, determining the second CP length may include operations, features, means, or instructions for determining, for the wireless connection, one or more of a signal to noise ratio (SNR), an inter-symbol interference (ISI), a thermal noise, or an interference based on one or more measurements of signals received on the wireless connection, and identifying the second CP length based on the one or more of the SNR, the ISI, the thermal noise, or the interference.

Some examples of the method, apparatuses, and non-transitory computer-readable medium described herein may further include operations, features, means, or instructions for determining that a magnitude of an effect of the ISI on the SNR may be below a predetermined threshold, the second CP length identified based on the magnitude of the effect being below the predetermined threshold.

Some examples of the method, apparatuses, and non-transitory computer-readable medium described herein may further include operations, features, means, or instructions for receiving one or more CSI reference signals (CSI-RS) according to a configuration for CSI-RS measurements, and determining the channel quality information based on the one or more CSI-RSs.

In some examples of the method, apparatuses, and non-transitory computer-readable medium described herein, the configuration for CSI-RS measurements may be associated with a CSI procedure, or a beam management procedure, or any combination thereof.

Some examples of the method, apparatuses, and non-transitory computer-readable medium described herein may further include operations, features, means, or instructions for performing one or more beam management procedures to select one or more beam parameters, where determining the second CP length may be further based on the one or more beam parameters.

In some examples of the method, apparatuses, and non-transitory computer-readable medium described herein, the second CP length may be shorter than the first CP length.

A method of wireless communication at a base station is described. The method may include establishing a wireless connection with a UE, communicating with the UE on the wireless connection using a numerology and a first CP configuration associated with a first CP length, receiving, from the UE, an indication of a second CP length determined by the UE for the wireless connection and the numerology, and transmitting, based on the indication, downlink signals to the UE on the wireless connection using the numerology according to a second CP configuration associated with the second CP length.

An apparatus for wireless communication at a base station is described. The apparatus may include a processor, memory coupled with the processor, and instructions stored in the memory. The instructions may be executable by the processor to cause the apparatus to establish a wireless connection with a UE, communicate with the UE on the wireless connection using a numerology and a first CP configuration associated with a first CP length, receive, from the UE, an indication of a second CP length determined by the UE for the wireless connection and the numerology, and transmit, based on the indication, downlink signals to the UE on the wireless connection using the numerology according to a second CP configuration associated with the second CP length.

Another apparatus for wireless communication at a base station is described. The apparatus may include means for establishing a wireless connection with a UE, communicating with the UE on the wireless connection using a numerology and a first CP configuration associated with a first CP length, receiving, from the UE, an indication of a second CP length determined by the UE for the wireless connection and the numerology, and transmitting, based on the indication, downlink signals to the UE on the wireless connection using the numerology according to a second CP configuration associated with the second CP length.

A non-transitory computer-readable medium storing code for wireless communication at a base station is described. The code may include instructions executable by a processor to establish a wireless connection with a UE, communicate with the UE on the wireless connection using a numerology and a first CP configuration associated with a first CP length, receive, from the UE, an indication of a second CP length determined by the UE for the wireless connection and the numerology, and transmit, based on the indication, downlink signals to the UE on the wireless connection using the numerology according to a second CP configuration associated with the second CP length.

In some examples of the method, apparatuses, and non-transitory computer-readable medium described herein, receiving the indication may include operations, features, means, or instructions for receiving the indication in at least a CSI report, or a beam management report, or a report different from the CSI report and the beam management report, or any combination thereof.

Some examples of the method, apparatuses, and non-transitory computer-readable medium described herein may further include operations, features, means, or instructions for determining that a first time period for the first CP configuration may have elapsed before determining to transmit the downlink signals to the UE according to the second CP configuration.

Some examples of the method, apparatuses, and non-transitory computer-readable medium described herein may further include operations, features, means, or instructions for starting a timer based on receiving the indication of the second CP length, where determining that the first time period may have elapsed may be based on starting the timer.

In some examples of the method, apparatuses, and non-transitory computer-readable medium described herein, the second CP length includes one CP length of a set of CP lengths configured for the UE.

Some examples of the method, apparatuses, and non-transitory computer-readable medium described herein may further include operations, features, means, or instructions for transmitting, to the UE, a configuration indicating the set of CP lengths.

Some examples of the method, apparatuses, and non-transitory computer-readable medium described herein may further include operations, features, means, or instructions for transmitting, to the UE at least in part in response to the indication of the second CP length, an acknowledgement of the second CP length for the downlink signals.

Some examples of the method, apparatuses, and non-transitory computer-readable medium described herein may further include operations, features, means, or instructions for transmitting one or more CSI-RSs according to a configuration for CSI-RS measurements, where the second CP length may be based on the one or more CSI-RSs.

In some examples of the method, apparatuses, and non-transitory computer-readable medium described herein, the configuration for CSI-RS measurements may be associated with a CSI procedure, or a beam management procedure, or any combination thereof.

Some examples of the method, apparatuses, and non-transitory computer-readable medium described herein may further include operations, features, means, or instructions for identifying a group of UEs that includes the UE, each UE of the group of UEs associated with a same CP length for downlink signals, and communicating with the group of UEs using a frequency division multiplexing scheme that may be based on identifying the group of UEs that may be associated with the same CP length.

In some examples of the method, apparatuses, and non-transitory computer-readable medium described herein, the second CP length may be shorter than the first CP length.

DETAILED DESCRIPTION

Figure 1:
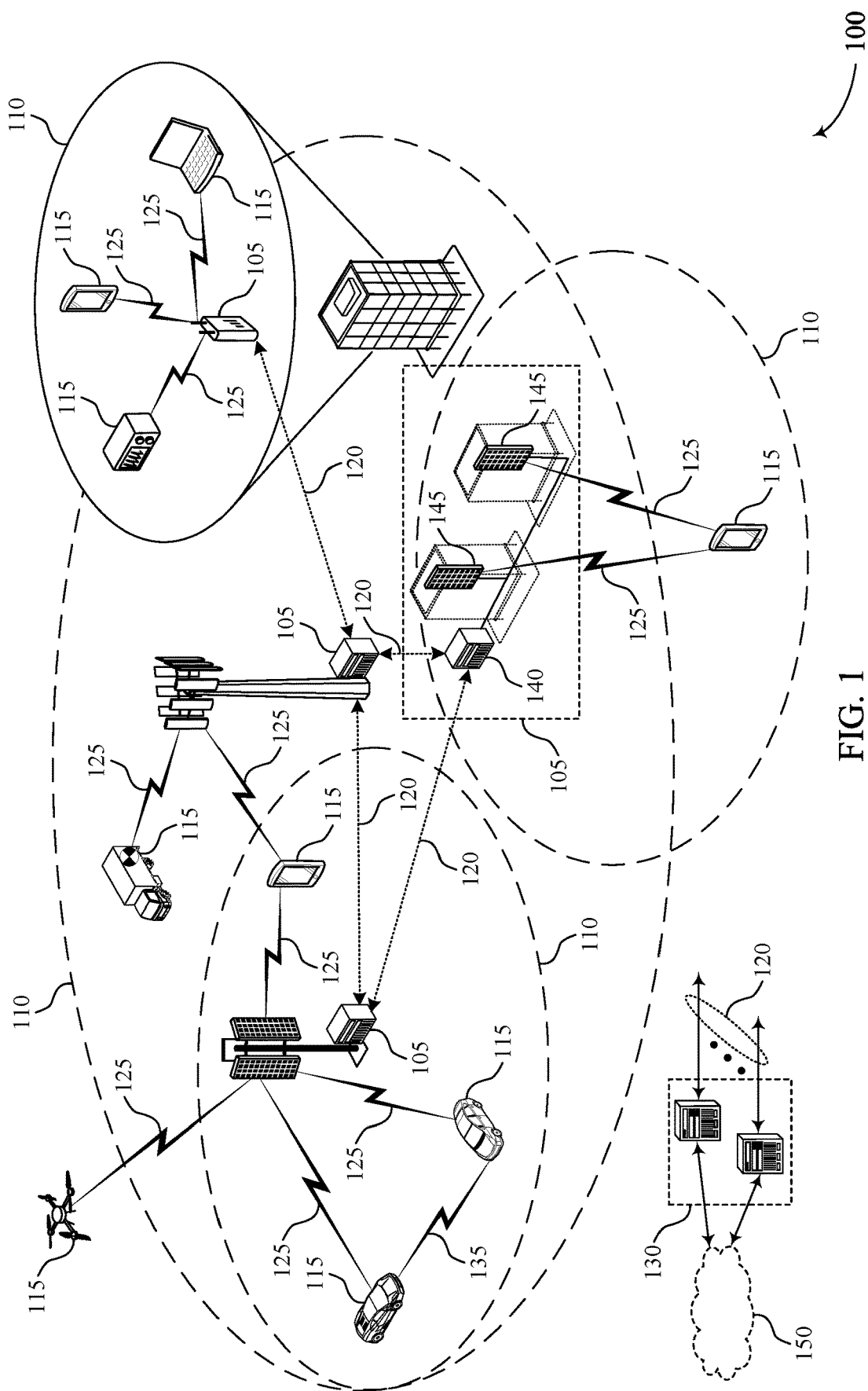
FIG. 1 illustrates an example of a wireless communications system that supports dynamic cyclic prefix selection in accordance with aspects of the present disclosure.

A base station and a user equipment (UE) may establish a wireless connection using a first cyclic prefix (CP) length and may communicate in the downlink on the wireless connection using a numerology scheme (e.g., a subcarrier spacing) and the first CP length. For example, the base station may transmit one or more synchronization signals or one or more reference signals to the UE, where the one or more synchronization signals or one or more reference signals may be associated with the first CP length. A CP may represent or be associated with signaling overhead, where some or all of the CP may be used for reducing interference (e.g., inter-symbol interference (ISI)), instead of communicating information.

A CP may be configured to cover a worst-case or largest interference scenario and may be statically configured by the base station for communications with the base station (e.g., based on one or more characteristics of the communications, such as expected or actual interference). In some cases, however, a CP duration may be larger than an associated interference duration (e.g., based on a communication frequency range or a communication beam), such as a duration of IS. At some interference levels (e.g., some communication environments), an interference or noise introduced by ISI may be smaller (e.g., much smaller) than other noise and interference (e.g., thermal noise). In these and other cases described herein, the first CP length (e.g., a static or fixed first CP length) associated with downlink communications between the UE and the base station may be associated with a larger overhead than what is actually used to reduce ISI or other noise.

The present disclosure provides techniques for reducing overhead associated with a CP by supporting dynamic determination of a second CP length at the UE for downlink communications with the base station. For example, the UE may establish a wireless connection with the base station by receiving initial communications according to a first CP configuration associated with the first CP length. The UE may determine a second CP length after establishing the wireless connection and may transmit an indication to the base station, indicating the second CP length. The base station may receive the indication and may transmit downlink signals according to a second CP configuration associated with the second CP length. The initial communications and the downlink signals may use a same numerology (including the same subcarrier spacing and symbol duration), such that the second CP length may be associated with the same numerology as the first CP length.

The UE may determine the second CP length based on an estimated or measured delay spread for an associated channel or based on a noise measurement and a relative strength of an ISI to the noise measurement. The second CP length may be shorter than the first CP length and may reduce overhead associated with the first CP length (e.g., may increase spectral efficiency or utilization), for example, by refraining from using some CP overhead when using such overhead may fail to decrease an overall noise level. For example, when ISI is relatively small compared to the CP or when an effect of ISI compared to overall noise is small, the CP length and associated overhead may be reduced. Determining and using a second CP length may also increase flexibility to adapt to different frequency ranges or different environments (e.g., different signaling or mobility environments) experienced by the UE.

Aspects of the disclosure are initially described in the context of wireless communications systems. Aspects of the disclosure are further illustrated by and described with reference to a communication scheme, a process flow, apparatus diagrams, system diagrams, and flowcharts that relate to dynamic cyclic prefix selection.

FIG. 1 illustrates an example of a wireless communications system 100 that supports dynamic cyclic prefix selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal to noise ratio (SNR), or otherwise acceptable signal quality based on listening according to multiple beam directions).

A base station 105 and a UE 115 may establish a wireless connection using a first CP length and may communicate in the downlink on the wireless connection using a numerology scheme (e.g., a subcarrier spacing) and the first CP length (e.g., according to a first CP configuration associated with the first CP length). The UE 115 may determine a second CP length after establishing the wireless connection and may transmit an indication of the second CP length to the base station 105. The base station 105 may receive the indication and may transmit downlink signals according to a second CP configuration associated with the second CP length. The initial communications and the downlink signals may use a same numerology (including the same subcarrier spacing and symbol duration), such that the second CP length may be associated with the same numerology scheme as the first CP length.

Figure 2:
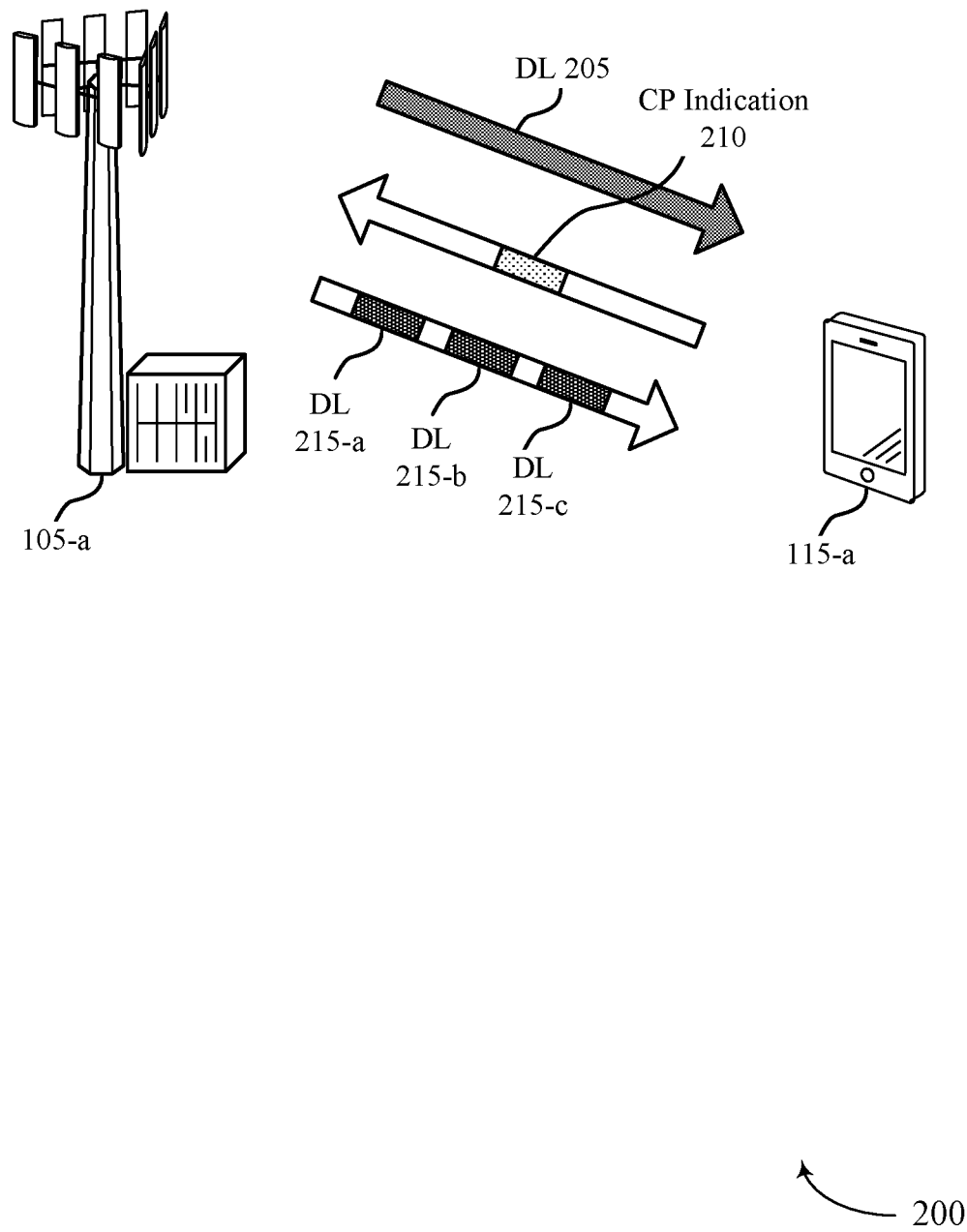
FIG. 2 illustrates an example of a wireless communications system that supports dynamic cyclic prefix selection in accordance with aspects of the present disclosure.

FIG. 2 illustrates an example of a wireless communications system 200 that supports dynamic CP selection in accordance with aspects of the present disclosure. In some examples, wireless communications system 200 may implement aspects of wireless communications system 100. For example, wireless communications system 200 may include a base station 105-a and a UE 115-a, which may represent examples of a base station 105 and a UE 115 described with reference to FIG. 1. Base station 105-a and UE 115-a may establish a wireless connection using a first CP length and may communicate using a numerology scheme (e.g., a subcarrier spacing) and the first CP length.

For example, base station 105-a may transmit one or more synchronization signals (e.g., a synchronization signal block (SSB)) or one or more reference signals, where the one or more synchronization signals or one or more reference signals may be associated with the first CP length (e.g., a normal CP or an extended CP). The one or more synchronization signals or reference signals may represent some or all of downlink signaling 205 implemented by base station 105-a and UE 115-a to establish a wireless connection. A CP may represent a portion at a beginning of a symbol (e.g., an OFDM symbol), where the CP may be used a guard period between consecutive symbols (e.g., adds a guard period between consecutive symbols), for example, to reduce ISI. An ISI for a wireless communications channel may be associated with a channel impulse response (CIR) of the channel, where the CIR may measure or represent a delay spread between different paths of a wireless signal. A CP length (e.g., CP size) longer than a duration of a CIR may, in some cases, remove or reduce ISI for the associated channel.

A signal received within a symbol may represent information conveyed within the symbol, as well as an associated CP. The CP may include some of the information conveyed at an end of the symbol, which may be appended to the beginning of the symbol as the CP. UE 115-a may sample the signal and may process some portions (e.g., a first number of samples) of the signal, while refraining from processing of other portions (e.g., a second number of samples) of the signal that may be associated with a length of the CP (e.g., in samples, such as the second number of samples). The CP and associated symbol may be configured such that UE 115-a may process the first number of samples at any portion of the symbol (e.g., including or excluding the CP) to decode the information associated with the symbol.

A CP may thus represent or be associated with signaling overhead (e.g., unprocessed information), such that some or all of the CP length may be used for reducing the ISI instead of communicating information. A CP may be or include a normal CP or an extended CP, where an extended CP may be longer than a normal CP. A normal CP may therefore reduce overhead with respect to an extended CP, because an extended CP may be larger or longer than a normal CP. Table 1 illustrates some examples of overhead associated with a normal CP, such as CP overhead for different numerologies or subcarrier spacings.

TABLE 1

Example of normal CP lengths and associated overhead

| Numerology | Subcarrier Spacing (kHz) | Symbol Duration (microseconds (µs)) | CP for Long Symbols (µs) | Overhead (Percent) | CP for Other Symbols (µs) | Overhead (Percent) |
| --- | --- | --- | --- | --- | --- | --- |
| 0 | 15 | 66.67 | 5.2 | 7.8 | 4.69 | 7.0 |
| 1 | 30 | 33.33 | 2.53 | 8.6 | 2.34 | 7.0 |
| 2 | 60 | 16.67 | 1.69 | 10.2 | 1.17 | 7.0 |
| 3 | 120 | 8.33 | 1.11 | 13.3 | 0.59 | 7.0 |
| 4 | 240 | 4.17 | 0.81 | 19.5 | 0.29 | 7.0 |

A CP may be configured to cover a worst-case or largest CIR (e.g., largest expected CIR) for a channel in order to reduce ISI. For example, the first CP length may be statically configured by base station 105-a for communications associated with base station 105-a (e.g., based on one or more characteristics of the communications, such as CIR). In some cases, however, a duration of a CIR may be smaller than (e.g., much smaller than) a CP duration. For example, some higher frequency bands (e.g., frequency ranges of greater than or equal to 100 GHz) or some modulation coding schemes (MCSs) (e.g., lower MCSs) may be associated with a relatively lower ISI. Additionally, in some frequency ranges (e.g., frequency range 2 (FR2)) UE 115-a may select one or more communication beams for downlink signals that may reduce the CIR duration and associated ISI. In some cases, UE 115-a may the select one or more communication beams to reduce power consumption and dissipation at UE 115-a based on communicating in higher frequency ranges.

In one example, UE 115-a may use a reduced CIR as a criterion for selecting one or more communication beams. UE 115-a may, for example, take into account a delay spread associated with the CIR and select or request a precoding scheme (e.g., from base station 105-a) that may reduce the delay spread and the CIR (e.g., reduce the delay spread and the CIR to be close to zero). The higher frequency bands, the one or more communication beams, or both, may result in a reduced ISI, and in some cases, an ISI duration may fall below the first CP length. Further, for some noise levels (e.g., some communication environments), an interference or noise introduced by ISI may be smaller (e.g., less than, or much smaller such as by one, two, or more orders of magnitude) than other noise and interference (e.g., thermal noise). For example, a lower MCS may result in a relatively smaller ISI, compared with other noise. In these and other cases described herein, the first CP length (e.g., a static or fixed first CP length) used by UE 115-a and base station 105-a may be associated with a larger overhead than what is used to reduce ISI or other noise.

The present disclosure provides techniques for reducing overhead associated with a CP by supporting dynamic determination of a second CP length at UE 115-a. For example, UE 115-a may establish a wireless connection with base station 105-a by receiving downlink signaling 205 according to a first CP configuration associated with the first CP length (e.g., a first slot or TTI format). UE 115-a may determine a second CP length after establishing the wireless connection and may transmit a CP indication 210 to base station 105-a, indicating the second CP length. The CP indication 210 may be included in a channel state information (CSI) report, a beam management report, or a different report (e.g., a report configured for the CP indication 210).

Base station 105-a may receive the CP indication 210 and may transmit downlink signals 215 according to a second CP configuration (e.g., a second slot or TTI format) associated with the second CP length. In the examples described herein, the downlink signaling 205 and the downlink signals 215 may be associated with a same numerology or subcarrier spacing, such that UE 115-a may determine the second CP length for the numerology scheme associated with the downlink signaling 205.

UE 115-a may determine the second CP length based on an estimated or measured CIR for an associated channel. In some cases, UE 115-a may use the CIR to determine a delay spread for the channel and may set the second CP length to be greater than or equal to the delay spread. In some cases, the CIR may be based on one or more beam management procedures performed by UE 115-a (e.g., may be based on a CIR reduced via beamforming). UE 115-a may additionally or alternatively determine the second CP length based on a noise measurement (e.g., an SNR), as well as a relative strength of an ISI to the noise measurement. For example, UE 115-a may determine that a relative strength of the ISI to an SNR measurement is below a threshold and may determine the second CP length (e.g., a shorter CP length) based on the relative strength being below the threshold.

The second CP length indicated by UE 115-a may represent a minimum or lowest CP length (e.g., CP size) supported by UE 115-a, based on communication conditions. The second CP length may be shorter than the first CP length, and may reduce overhead associated with the first CP length (e.g., may increase spectral efficiency or utilization), for example, by refraining from using some CP overhead when using such overhead may fail to decrease an overall noise level. For example, when CIR is relatively small or when an effect of ISI compared to SNR is small, the CP length and associated overhead may be reduced. Determining and using a second CP length may also increase flexibility to adapt to different frequency ranges or different environments (e.g., different signaling or mobility environments) experienced by UE 115-a.

In some cases, base station 105-a may transmit an acknowledgement of the second CP length, where the acknowledgement may indicate that the downlink signals 215 are to be transmitted according to the second CP configuration. In some cases, base station 105-a may communicate with a group of UEs 115, including the UE 115-a, using an FDM scheme. In such cases, base station 105-a may group UEs 115 according to a supported CP length or TTI format (e.g., the second CP length). Base station 105-a may, for example, limit FDM transmissions within a slot to UEs 115 supporting a same CP length (e.g., UEs 115 included in a same group, supporting a same TTI format). In one example, the downlink signals 215 may include downlink signals 215 that are transmitted to UE 115-a and are FDMed with other downlink signals 215 transmitted to other UEs 115 within a same group (e.g., UEs 115 having a same second CP length). In some cases, the group of UEs 115 may use a same frequency band for communications with base station 105-a (e.g., a 100 MHz frequency band).

Grouping UEs 115 according to CP length and transmitting to grouped UEs 115 may support FDM techniques at base station 105-a. For example, base station 105-a may be unable to transmit using an FDM scheme to UEs 115 supporting different CP lengths (e.g., and may therefore group UEs 115 according to CP length for FDMed transmissions). In some cases, base station 105-a may transmit to UEs 115 having different CP lengths in an FDM manner by using frequency guard bands between transmissions to different UEs 115. Such techniques may be applied, for example, to a relatively smaller number of UEs 115 receiving FDMed transmissions.

Figure 3:
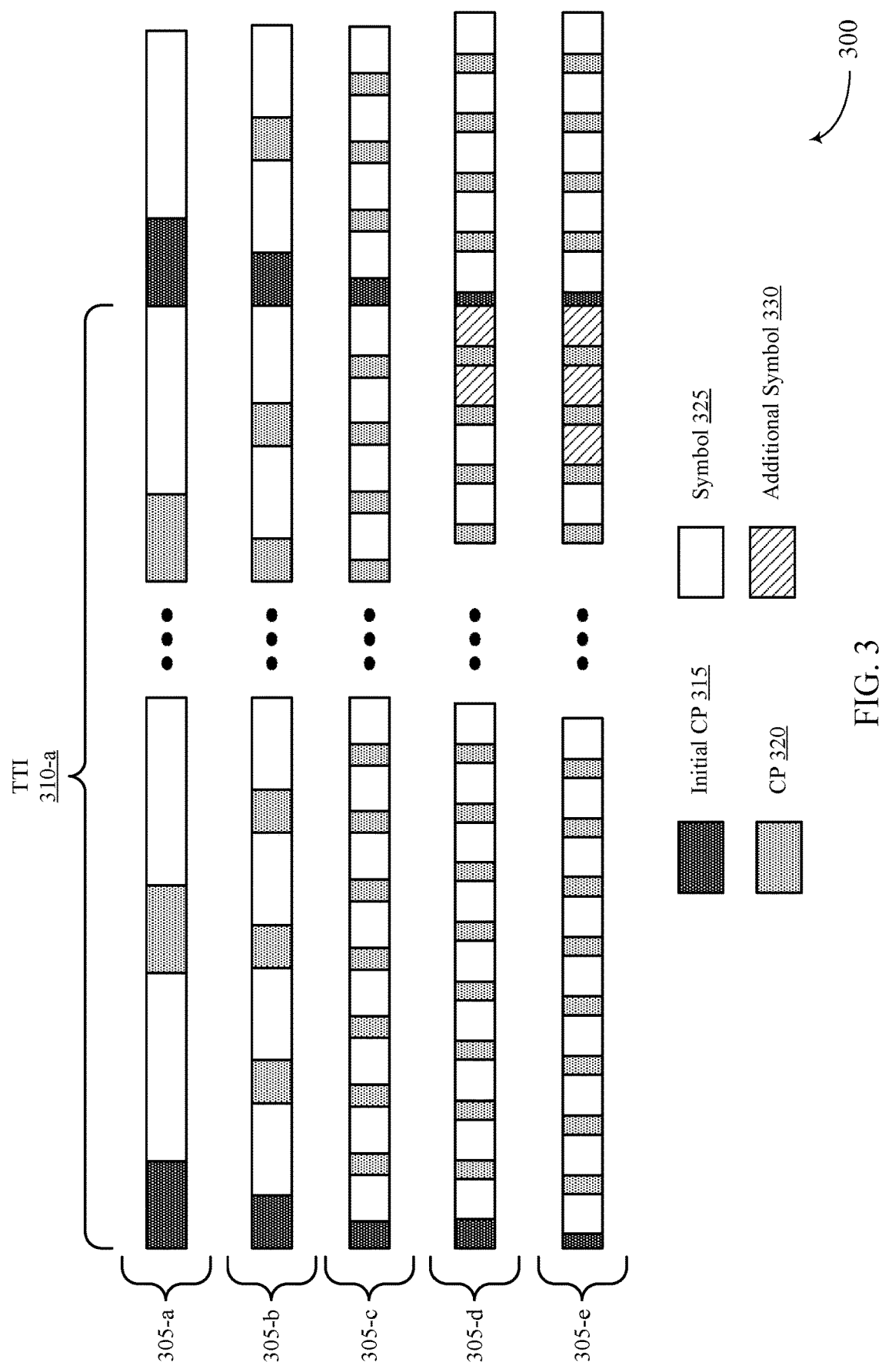
FIG. 3 illustrates an example of a communication scheme that supports dynamic cyclic prefix selection in accordance with aspects of the present disclosure.

FIG. 3 illustrates an example of a communication scheme 300 that supports dynamic CP selection in accordance with aspects of the present disclosure. In some examples, communication scheme 300 may implement or be implemented by aspects of wireless communications system 100 or 200. For example, communication scheme 300 may be used by a base station 105 to communicate with a UE 115 using one or more CP lengths as described with reference to FIG. 2. The base station 105 and the UE 115 may be examples of a base station 105 and a UE 115 described with reference to FIGS. 1 and 2. The base station 105 and the UE 115 may communicate downlink signals according to one or more CP configurations 305 of the communication scheme.

Some CP configurations 305 may be associated with different subcarrier spacings or numerologies, and the base station 105 and the UE 115 may communicate according to the CP configuration 305 corresponding to a numerology for communications between the UE 115 and the base station 105. In one example, CP configurations 305-a, 305-b, and 305-c may correspond to different numerologies. CP configuration 305-a may, for example, correspond to a subcarrier spacing of 30 kHz, CP configuration 305-b may correspond to a subcarrier spacing of 60 kHz, and CP configuration 305-c may correspond to a subcarrier spacing of 120 kHz. CP configurations 305-a, 305-b, and 305-c may represent CP configurations associated with a first CP length for establishing a wireless connection between the UE 115 and the base station 105, for example, as described herein with reference to FIG. 2.

CP configuration 305-a may represent a communication configuration in which an initial CP 315 of a first TTI 310-a (e.g., a slot) may have a length or size of 352 samples, and other CPs 320 may have a length or size of 288 samples, among other examples. Other TTIs 310 may be associated with different CP lengths for an initial CP 315, for example, based on an order of the TTIs 310. In one example, a first TTI 310-a (e.g., a slot0 or a slot4) may have a longer CP length for the initial CP 315 and one or more following TTIs may have a shorter CP length for the initial CP 315. For example, a TTI 310 following TTI 310-a may include an initial CP 315 with a length or size of 320 samples, among other examples. A symbol 325 of CP configuration 305-a may include 4,096 samples, among other examples.

CP configuration 305-b may represent a communication configuration in which an initial CP 315 of a first TTI 310-a (e.g., a slot) may have a length or size of 208 samples, and other CPs 320 may have a length or size of 144 samples, among other examples. A TTI 310 following TTI 310-a may include an initial CP 315 with a length or size of 160 samples, among other examples. A symbol 325 of CP configuration 305-b may include 2,048 samples, among other examples. CP configuration 305-c may represent a communication configuration in which an initial CP 315 of a first TTI 310-a (e.g., a slot) may have a length or size of 136 samples, and other CPs 320 may have a length or size of 72 samples, among other examples. A TTI 310 following TTI 310-a may include an initial CP 315 with a length or size of 80 samples, among other examples. A symbol 325 of CP configuration 305-c may include 1,024 samples, among other examples.

Some CP configurations 305 may correspond to a same numerology or subcarrier spacing and may include different lengths for CPs 315 and 320. For example, CP configurations 305-c, 305-d, and 305-e may correspond to a same numerology, but each CP configuration 305 may be associated with a different corresponding length for CPs 315 and 320. In one example, CP configurations 305-c, 305-d, and 305-e may each correspond to a subcarrier spacing of 120 kHz. In some cases, CP configuration 305-c may be associated with a first CP length for establishing a connection between the base station 105 and the UE 115, and CP configurations 305-d and 305-e may be associated with a length of a CP 320 indicated by the UE 115 (e.g., a second CP length). While the examples described herein describe CP configurations 305 for the first CP length and the second CP length as being associated with a subcarrier spacing of 120 kHz, these examples may equally apply to any subcarrier spacing or numerology.

CP configuration 305-c may represent a communication configuration in which an initial CP 315 of a first TTI 310-a (e.g., a slot) may have a length or size of 136 samples, and other CPs 320 may have a length or size of 72 samples, among other examples. A TTI 310 following TTI 310-a may include an initial CP 315 with a length or size of 80 samples, among other examples. A symbol 325 of CP configuration 305-c may include 1,024 samples, among other examples.

CP configuration 305-d may represent a communication configuration in which an initial CP 315 of a first TTI 310-a (e.g., a slot) may have a length or size of 224 samples, and other CPs 320 may have a length or size of 32 samples, among other examples. A TTI 310 following TTI 310-a may include an initial CP 315 with a length or size of 40 samples, among other examples. A symbol 325 of CP configuration 305-d may include 1,024 samples, among other examples.

In this example of CP configurations 305-c and 305-d, the UE 115 and the base station 105 may establish a wireless connection using CP configuration 305-c (e.g., using an associated CP length of 72 samples). The UE 115 may determine and indicate a second CP length (e.g., reduced from 72 samples to 32 samples) to the base station 105, and the UE 115 and the base station 105 may communicate downlink signals using CP configuration 305-d, which may be associated with the second CP length. The reduction of the CP length, such as from 72 samples to 32 samples (e.g., with the samples taken over 122.88 MHz), may reduce CP overhead and may support inclusion of additional symbols 330 within a TTI 310.

For example, the first TTI 310-*a* of CP configuration 305-*d* may include 58 total symbols 325 (e.g., 61,440 total samples, according the size of the initial CP 315 and the CPs 320), where the total may include two additional symbols 330 (e.g., compared to CP configuration 305-*c*). The gain of the two additional symbols 330 may represent a 3.57 percent increase of symbols 325 for communications between the UE 115 and the base station 105 from CP configuration 305-*c* to CP configuration 305-*d*. In CP configuration 305-*d*, a complexity of a receiver of the UE 115 may stay the same as a complexity associated with CP configuration 305-*c*. For example, the receiver may simply refrain from processing a different number of samples for each symbol 325, compared to CP configuration 305-*c*.

In a similar example, CP configuration 305-*e* may represent a communication configuration in which an initial CP 315 of a first TTI 310-*a* (e.g., a slot) may have a length or size of 96 samples, and other CPs 320 may have a length or size of 16 samples, among other examples. A TTI 310 following TTI 310-*a* may include an initial CP 315 with a length or size of 24 samples, among other examples. A symbol 325 of CP configuration 305-*e* may include 1,024 samples, among other examples.

In this example of CP configurations 305-*c* and 305-*e*, the UE 115 and the base station 105 may establish a wireless connection using CP configuration 305-*c* (e.g., using an associated CP length of 72 samples). The UE 115 may determine and indicate a second CP length (e.g., reduced from 72 samples to 16 samples) to the base station 105, and the UE 115 and the base station 105 may communicate downlink signals using CP configuration 305-*e*, which may be associated with the second CP length. The reduction of the CP length, such as from 72 samples to 16 samples (e.g., with the samples taken over 122.88 MHz), may reduce CP overhead and may support inclusion of additional symbols 330 within a TTI 310.

For example, the first TTI 310-*a* of CP configuration 305-*e* may include 59 total symbols 325 (e.g., 61,440 total samples, according the size of the initial CP 315 and the CPs 320), where the total may include three additional symbols 330 (e.g., compared to CP configuration 305-*c*). The gain of the two additional symbols 330 may represent a 5.4 percent increase of symbols 325 for communications between the UE 115 and the base station 105 from CP configuration 305-*c* to CP configuration 305-*e*. In CP configuration 305-*e*, a complexity of a receiver of the UE 115 may stay the same as a complexity associated with CP configuration 305-*c*. For example, the receiver may simply refrain from processing a different number of samples for each symbol 325, compared to CP configuration 305-*c*.

In the examples described herein, a TTI 310 (e.g., a slot) may align with initial symbol boundaries of multiple CP configurations 305. For example, TTI 310-*a* may align with initial symbols of CP configurations 305-*c*, 305-*d*, and 305-*e*, among other examples, even when these CP configurations 305 support different CP lengths. A TTI 310 may, in some cases, be configured to include a same number of samples for CP configurations 305-*c*, 305-*d*, and 305-*e* (e.g., 61,440 samples), which number of samples may represent a TTI 310 length. A TTI 310 may additionally or alternatively be configured to span a same duration for each CP configuration 305 (e.g., 0.5 ms). The UE 115 may process received signals for different CP configurations 305 (e.g., CP configurations 305-*c*, 305-*d*, and 305-*e*) by refraining from processing (e.g., dropping) a different number of samples of a received signal for different CP configurations 305.

Figure 4:
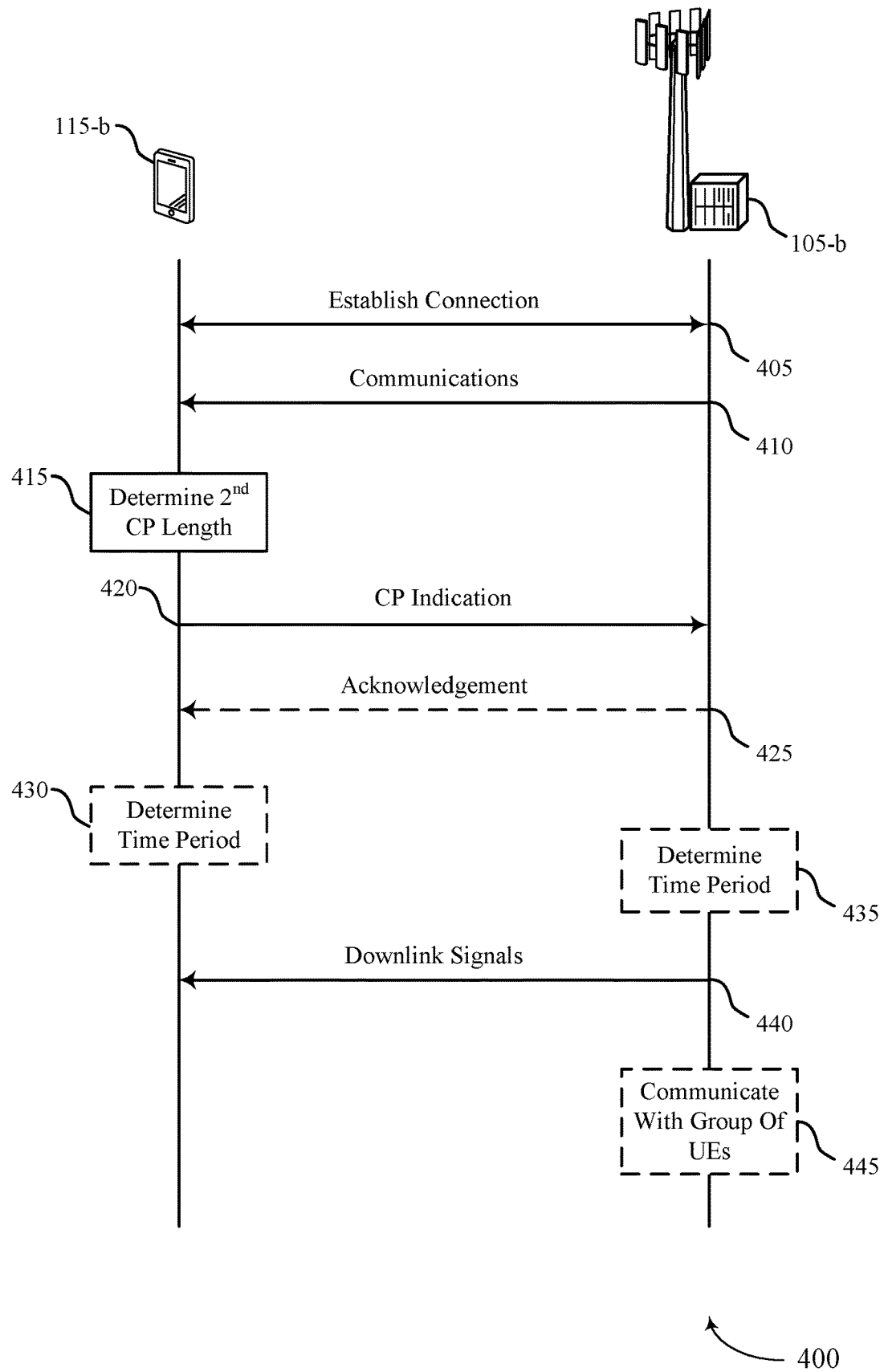
FIG. 4 illustrates an example of a process flow that supports dynamic cyclic prefix selection in accordance with aspects of the present disclosure.

FIG. 4 illustrates an example of a process flow 400 that supports dynamic CP selection in accordance with aspects of the present disclosure. In some examples, process flow 400 may implement or be implemented by aspects of wireless communications system 100 or 200. For example, process flow 400 may be implemented by a UE 115-*b* and a base station 105-*b*, which may be examples of a UE 115 and a base station 105 described with reference to FIGS. 1-3. Some aspects of process flow 400 may also implement or be implemented by aspects of communication scheme 300. UE 115-*b* and base station 105-*b* may implement aspects of process flow 400 to adjust a CP size or length after establishing a wireless connection for communications between UE 115-*b* and base station 105-*b*.

In the following description of process flow 400, the operations between UE 115-*b* and base station 105-*b* may be transmitted in a different order than the order shown, or the operations performed by UE 115-*b* and base station 105-*b* may be performed in different orders or at different times. For example, specific operations may also be left out of process flow 400, or other operations may be added to process flow 400. Although UE 115-*b* and base station 105-*b* are shown performing the operations of process flow 400, some aspects of some operations may also be performed by one or more other wireless devices.

At 405, UE 115-*b* and base station 105-*b* may establish a wireless connection. For example, UE 115-*b* may receive an SSB and other initial attachment information (e.g., broadcast signaling) from base station 105-*b*. The SSB and other initial attachment information may be transmitted using a first numerology and a first CP configuration associated with a first CP length. In some cases, UE 115-*b* may transmit one or more communications to base station 105-*b* as part establishing the wireless connection. For example, UE 115-*b* and base station 105-*b* may perform one or more random access procedures, such as communicating random access messages. Random access messages transmitted by base station 105-*b* may be transmitted according to the first CP configuration.

At 410, UE 115-*b* and base station 105-*b* may communicate on the wireless connection using the numerology and the first CP configuration. For example, base station 105-*b* may transmit one or more CSI-RS, where the CSI-RS may be associated with a CSI procedure, a beam management procedure, or both. UE 115-*b* may receive the one or more CSI-RS according to a configuration for CSI-RS measurements (e.g., associated with the CSI procedure, the beam management procedure, or both). Base station 105-*b* may transmit the one or more CSI-RS according to the first CP configuration.

At 415, UE 115-*b* may determine a second CP length for the numerology based on channel quality information for the wireless connection. In a first example, UE 115-*b* may determine the second CP length based on one or more beam parameters selected during a beam management procedure (e.g., one or more beam management procedures). In the beam management procedure, UE 115-*b* may, for example, select a best beam pair, rank, and/or precoding matrix, for a downlink communication beam from base station 105-*b*. The beam management procedure may be based on the one or more CSI-RS received from base station 105-*b*.

In some cases, when performing the beam management procedure, UE 115-*b* may select a beam pair that may have a relatively smaller CIR duration (e.g., a smallest CIR duration). Doing so may decrease a delay spread and associated ISI experienced by UE 115-*b*, which may support selection of a smaller CP length for the second CP length. In such cases, the second CP length may correspond to a CP length (e.g., minimal CP length) determined for the beam or beam pair selected by UE 115-*b*. In some cases, UE 115-*b* may estimate the CIR (e.g., in a time domain) using the one or more CSI-RS received from base station 105-*b*, such as one or more CSI-RS for a CSI procedure.

In the first example, UE 115-*b* may use the CIR (e.g., among other parameters) to determine the second CP length (e.g., a minimal CP length). UE 115-*b* may additionally or alternatively use information such as one or more selected beams, a channel, precoding information, the CIR, or any combination thereof, to determine the second CP length. In one example, UE 115-*b* may use the CIR to estimate a delay spread and may set the second CP length to be greater than or equal to the delay spread (e.g., slightly greater than the delay spread or within a threshold of the delay spread).

In a second example, UE 115-*b* may determine the second CP length based on environmental or channel factors, such as noise or interference experienced by UE 115-*b*. The noise or interference may be based on one or more measurements of signals received from base station 105-*b* on the wireless connection. For example, UE 115-*b* may determine, for the wireless connection, an SNR, an ISI, a thermal noise, an interference, or any combination thereof. UE 115-*b* may further determine the second CP length based on the SNR, the ISI, the thermal noise, the interference, or any combination thereof.

For example, UE 115-*b* may identify a magnitude of an effect of the ISI on the SNR (e.g., or other noise measurement, such as an interference measurement) and may determine whether the magnitude of the effect is below a threshold. If the magnitude of the effect of the ISI on the SNR is below the threshold, UE 115-*b* may determine that a CP length may be reduced (e.g., because ISI may not significantly contribute to overall noise). Accordingly, UE 115-*b* may determine the second CP length based on the magnitude of the effect of the ISI on the SNR (e.g., or other noise measurement). For example, UE 115-*b* may reduce the size or length of the first CP length by a first number of units for a first magnitude of the effect of the ISI and may reduce the size or length of the first CP length by a second number of units for a second magnitude of the effect of the ISI.

At 420, UE 115-*b* may transmit, to base station 105-*b*, an indication of the second CP length (e.g., a CP indication or report). UE 115-*b* may transmit the indication of the second CP length via a CSI report, a beam management report, a different report (e.g., a report configured for indicating the second CP length), or any combination thereof. UE 115-*b* may transmit the indication of the second CP length to base station 105-*b*, for example, based on a defined configuration or based on a triggering event (e.g., based on performing beam management, based on establishing the wireless connection), or both.

UE 115-*b* may communicate the second CP length as a compressed value (e.g., compressed to one or more bits). In some cases, UE 115-*b* may indicate an index corresponding to the second CP length, for example, based on one or more indices configured at UE 115-*b*. The one or more configured indices may be transmitted by base station 105-*b* to UE 115-*b* (e.g., via configuration signaling, such as when establishing the wireless connection), or may be stored at the UE 115-*b*.

In some cases, the indication of the second CP length may indicate a time to begin using the second CP length (e.g., a time period after which UE 115-*b* and base station 105-*b* may begin using the second CP length). For example, UE 115-*b* may indicate to begin using the second CP length a number of second or milliseconds (e.g., X seconds) after transmitting or after receiving (e.g., at base station 105-*b*) the indication of the second CP length.

At 425, in some cases, base station 105-*b* may transmit, to UE 115-*b*, an acknowledgement of the second CP length. The acknowledgement may, for example, indicate that the second CP length is associated with downlink signals to be transmitted by base station 105-*b* to UE 115-*b*. Base station 105-*b* may transmit the acknowledgement in response to the indication of the second CP length (e.g., based on receiving and implementing the second CP length). In some cases, UE 115-*b* may expect a change in CP length (e.g., based on the indicated second CP length) based on receiving the acknowledgement from base station 105-*b*. For example, UE 115-*b* may expect the change in CP length (e.g., as implemented by base station 105-*b*) at a slot or TTI boundary, such as a TTI following reception of the acknowledgement.

The acknowledgement may, in some cases, be included in a downlink control message (e.g., downlink control information (DCI) or a medium access control (MAC) control element (CE)) to UE 115-*b*, such as via a bit of a DCI (e.g., an additional or new bit), using a dedicated (e.g., new) DCI format, or both. Base station 105-*b* may also perform feedback to acknowledge reception of the indication of the second CP length, where the feedback may or may not be included with the acknowledgement of the second CP length.

At 430 and 435, UE 115-*b*, base station 105-*b*, or both, may respectively determine that a time period (e.g., X seconds) for the first CP configuration has elapsed. For example, UE 115-*b*, base station 105-*b*, or both, may start a timer upon reception or transmission of the indication of the second CP length and may determine that the time period has elapsed based on a value of the timer or an expiration of the timer. UE 115-*b*, base station 105-*b*, or both, may determine that the time period has elapsed before determining to communicate downlink signals associated with the second CP length. For example, UE 115-*b* or base station 105-*b* may not expect to receive or transmit a downlink signal associated with the second CP length until the time period has elapsed.

At 440, base station 105-*b* may transmit downlink signals to UE 115-*b* on the wireless connection based on the indication of the second CP length. The downlink signals may be transmitted using the numerology and according to a second CP configuration associated with the second CP length. For example, base station 105-*b* may determine to use the second CP length for downlink transmissions to UE 115-*b* and may transmit the downlink signals according to an associated CP configuration (e.g., the second CP configuration).

At 445, in some cases, base station 105-*b* may identify a group of UEs 115 that includes UE 115-*b*, where each UE 115 of the group may be associated with a same CP length (e.g., second CP length) for downlink signals. Base station 105-*b* may communicate with the group of UEs 115 using an FDM scheme, based on identifying the group of UEs 115 associated with the same CP length.

Figure 5:
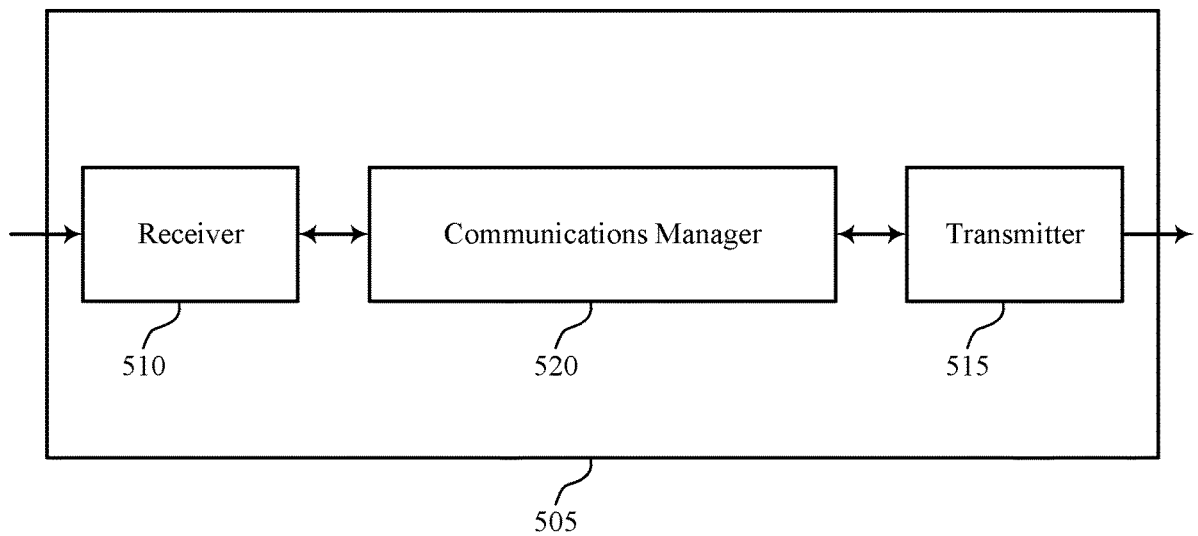
FIGS. 5 and 6 show block diagrams of devices that support dynamic cyclic prefix selection in accordance with aspects of the present disclosure.

FIG. 5 shows a block diagram 500 of a device 505 that supports dynamic CP selection in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the dynamic CP selection features described herein. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic CP selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to size-based neural network selection for autoencoder-based communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic CP selection as described herein.

In some examples, the communications manager 520, the receiver 510, the transmitter 515, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 520, the receiver 510, the transmitter 515, or various combinations thereof or components thereof, may be implemented in code (e.g., as communications management software or firmware) executed by a processor. If implemented in code executed by a processor, the functions of the communications manager 520, the receiver 510, the transmitter 515, or various combinations thereof or components thereof, may be executed by a general-purpose processor, a DSP, a central processing unit (CPU), an ASIC, an FPGA, or any combination of these or other programmable logic devices.

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured to provide or support a means for establishing a wireless connection with a base station. The communications manager 520 may be configured to provide or support a means for communicating with the base station on the wireless connection using a numerology and a first CP configuration associated with a first CP length. The communications manager 520 may be configured to provide or support a means for determining a second CP length for the numerology based on channel quality information for the wireless connection. The communications manager 520 may be configured to provide or support a means for transmitting, to the base station, an indication of the second CP length. The communications manager 520 may be configured to provide or support a means for receiving, based on transmitting the indication, downlink signals from the base station on the wireless connection using the numerology according to a second CP configuration associated with the second CP length.

The actions performed by the communications manager 520, among other examples herein, may be implemented to realize one or more potential advantages. For example, communications manager 520 may increase available battery power, communication quality, and throughput at a wireless device (e.g., a UE 115) by supporting dynamic selection of a CP. The increase in communication quality and data throughput may result in increased link performance and decreased overhead based on the dynamically selected CP. Accordingly, communications manager 520 may save power and increase battery life at a wireless device (e.g., a UE 115) by strategically increasing a quality of communications at a wireless device (e.g., a UE 115).

Figure 6:
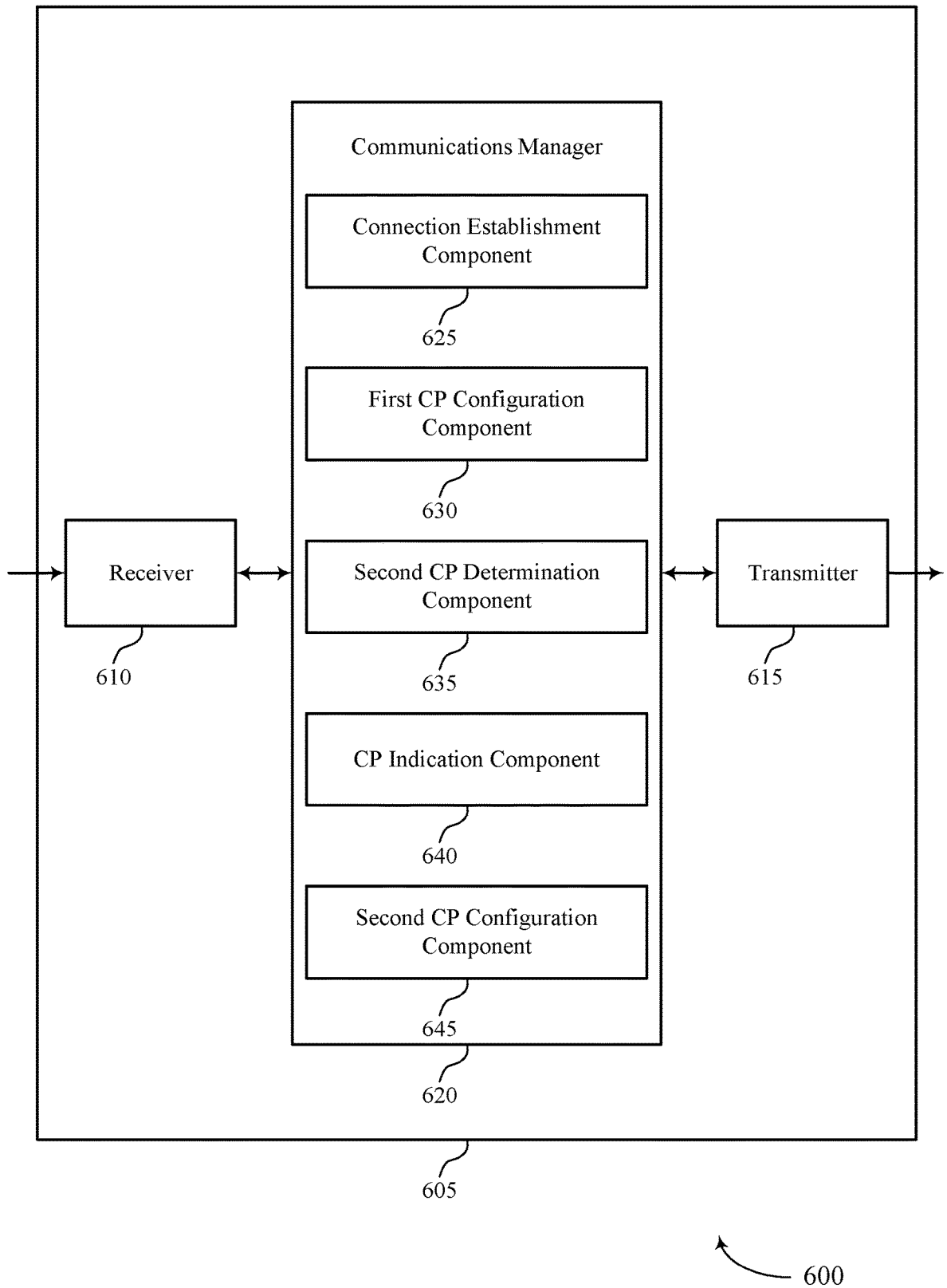

FIG. 6 shows a block diagram 600 of a device 605 that supports dynamic CP selection in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic CP selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to size-based neural network selection for autoencoder-based communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic CP selection as described herein. For example, the communications manager 620 may include a connection establishment component 625, a first CP configuration component 630, a second CP determination component 635, a CP indication component 640, a second CP configuration component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The connection establishment component 625 may be configured to provide or support a means for establishing a wireless connection with a base station. The first CP configuration component 630 may be configured to provide or support a means for communicating with the base station on the wireless connection using a numerology and a first CP configuration associated with a first CP length. The second CP determination component 635 may be configured to provide or support a means for determining a second CP length for the numerology based on channel quality information for the wireless connection. The CP indication component 640 may be configured to provide or support a means for transmitting, to the base station, an indication of the second CP length. The second CP configuration component 645 may be configured to provide or support a means for receiving, based on transmitting the indication, downlink signals from the base station on the wireless connection using the numerology according to a second CP configuration associated with the second CP length.

A processor of a wireless device (e.g., controlling the receiver 610, the transmitter 615, or the transceiver 820 as described with reference to FIG. 8) may increase available battery power, communication quality, and throughput. The increased communication quality may increase available battery power, communication quality, and throughput (e.g., via implementation of system components described with reference to FIG. 7) compared to other systems and techniques, for example, that do not support dynamic selection of a CP, which may decrease communication quality and increase power consumption. Further, the processor of the wireless device may identify one or more aspects of communication quality to dynamically determine the CP. The processor of the wireless device may use the dynamically determined CP to perform one or more actions that may result in increased communication quality, as well as save power and increase battery life at the wireless device (e.g., by strategically supporting increasing communication quality by using the dynamically determined CP), among other benefits.

In some cases, the connection establishment component 625, first CP configuration component, second CP determination component 635, CP indication component 640, and second CP configuration component 645 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the connection establishment component 625, the first CP configuration component, the second CP determination component 635, the CP indication component 640, and the second CP configuration component 645 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
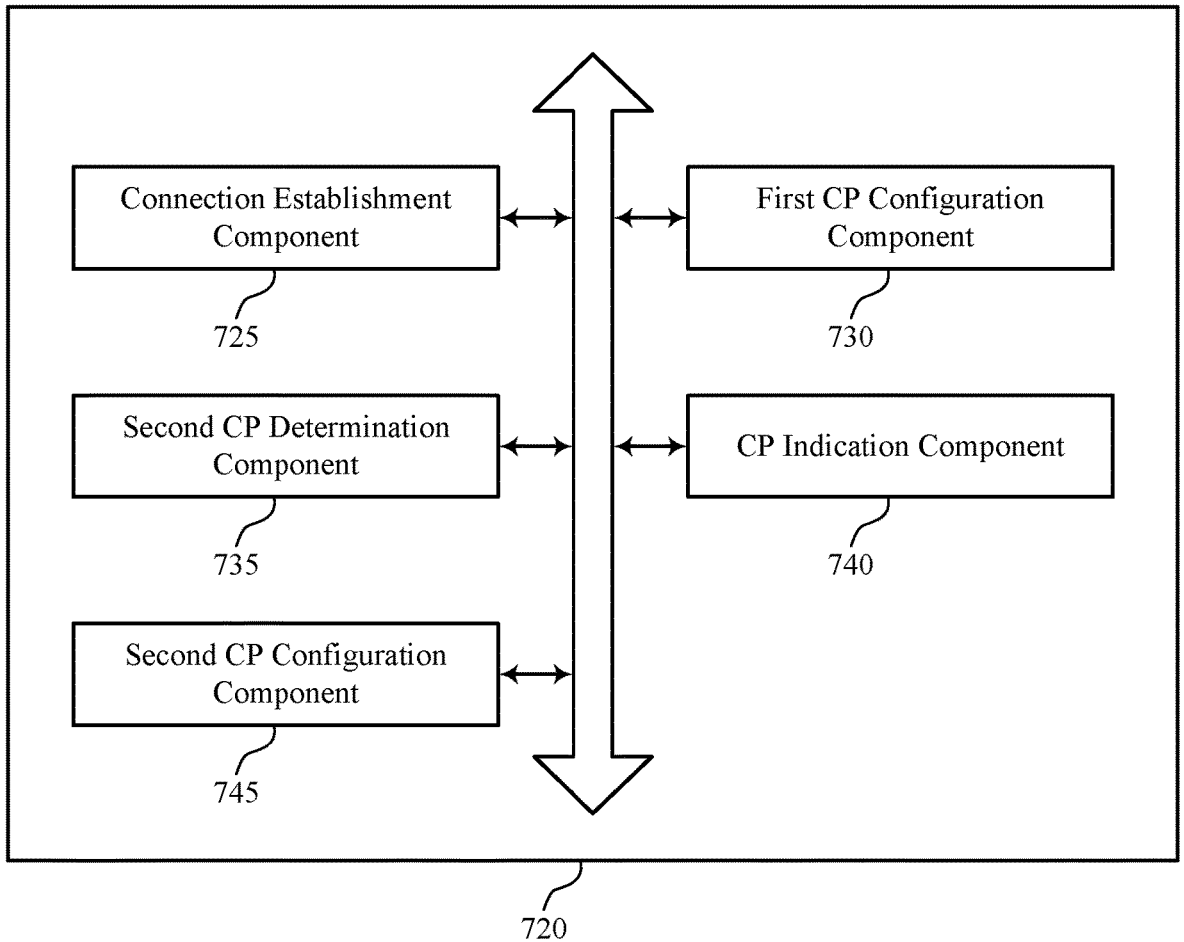
FIG. 7 shows a block diagram of a communications manager that supports dynamic cyclic prefix selection in accordance with aspects of the present disclosure.

FIG. 7 shows a block diagram 700 of a communications manager 720 that supports dynamic CP selection in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic CP selection as described herein. For example, the communications manager 720 may include a connection establishment component 725, a first CP configuration component 730, a second CP determination component 735, a CP indication component 740, a second CP configuration component 745, or any combination thereof. Each of these components may communicate, directly or indirectly, with one another (e.g., via one or more buses).

The communications manager 720 may support wireless communication at a UE in accordance with examples as disclosed herein. The connection establishment component 725 may be configured to provide or support a means for establishing a wireless connection with a base station. The first CP configuration component 730 may be configured to provide or support a means for communicating with the base station on the wireless connection using a numerology and a first CP configuration associated with a first CP length. The second CP determination component 735 may be configured to provide or support a means for determining a second CP length for the numerology based on channel quality information for the wireless connection. The CP indication component 740 may be configured to provide or support a means for transmitting, to the base station, an indication of the second CP length. The second CP configuration component 745 may be configured to provide or support a means for receiving, based on transmitting the indication, downlink signals from the base station on the wireless connection using the numerology according to a second CP configuration associated with the second CP length.

In some examples, to support determining the second CP length, the second CP determination component 735 may be configured to provide or support a means for selecting the second CP length from a set of CP lengths configured at the UE. In some examples, to support determining the second CP length, the second CP determination component 735 may be configured to provide or support a means for determining a CIR associated with the wireless connection based on one or more measurements of signals received on the wireless connection. In some examples, to support determining the second CP length, the second CP determination component 735 may be configured to provide or support a means for determining a delay spread associated with the wireless connection based on the CIR, the channel quality information including the delay spread. In some examples, to support determining the second CP length, the second CP determination component 735 may be configured to provide or support a means for setting the second CP length to be greater than or equal to the delay spread.

In some examples, the second CP determination component 735 may be configured to provide or support a means for receiving, from the base station, a configuration indicating the set of CP lengths, where selecting the second CP length from the set of CP lengths is based on the configuration indicating the set of CP lengths.

In some examples, to support determining the second CP length, the second CP determination component 735 may be configured to provide or support a means for determining, for the wireless connection, one or more of a SNR, an ISI, a thermal noise, or an interference based on one or more measurements of signals received on the wireless connection. In some examples, to support determining the second CP length, the second CP determination component 735 may be configured to provide or support a means for identifying the second CP length based on the one or more of the SNR, the ISI, the thermal noise, or the interference.

In some examples, the second CP determination component 735 may be configured to provide or support a means for determining that a magnitude of an effect of the ISI on the SNR is below a predetermined threshold, the second CP length identified based on the magnitude of the effect being below the predetermined threshold.

In some examples, the second CP determination component 735 may be configured to provide or support a means for receiving one or more CSI-RSs according to a configuration for CSI-RS measurements. In some examples, the second CP determination component 735 may be configured to provide or support a means for determining the channel quality information based on the one or more CSI-RSs. In some examples, the configuration for CSI-RS measurements is associated with a CSI procedure, or a beam management procedure, or any combination thereof.

In some examples, the second CP determination component 735 may be configured to provide or support a means for performing one or more beam management procedures to select one or more beam parameters, where determining the second CP length is further based on the one or more beam parameters.

In some examples, to support transmitting the indication, the CP indication component 740 may be configured to provide or support a means for transmitting the indication in a CSI report, or a beam management report, or a report different from the CSI report and the beam management report, or any combination thereof. In some examples, the CP indication component 740 may be configured to provide or support a means for receiving, from the base station at least in part in response to the indication of the second CP length, an acknowledgement of the second CP length for the downlink signals from the base station.

In some examples, the second CP configuration component 745 may be configured to provide or support a means for determining that a first time period for the first CP configuration has elapsed before determining to receive the downlink signals from the base station according to the second CP configuration. In some examples, the second CP configuration component 745 may be configured to provide or support a means for starting a timer based on transmitting the indication of the second CP length, where determining that the first time period has elapsed is based on starting the timer. In some examples, the second CP length is shorter than the first CP length.

In some cases, the connection establishment component 725, first CP configuration component 730, second CP determination component 735, CP indication component 740, and second CP configuration component 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the connection establishment component 725, first CP configuration component 730, second CP determination component 735, CP indication component 740, and second CP configuration component 745 discussed herein.

Figure 8:
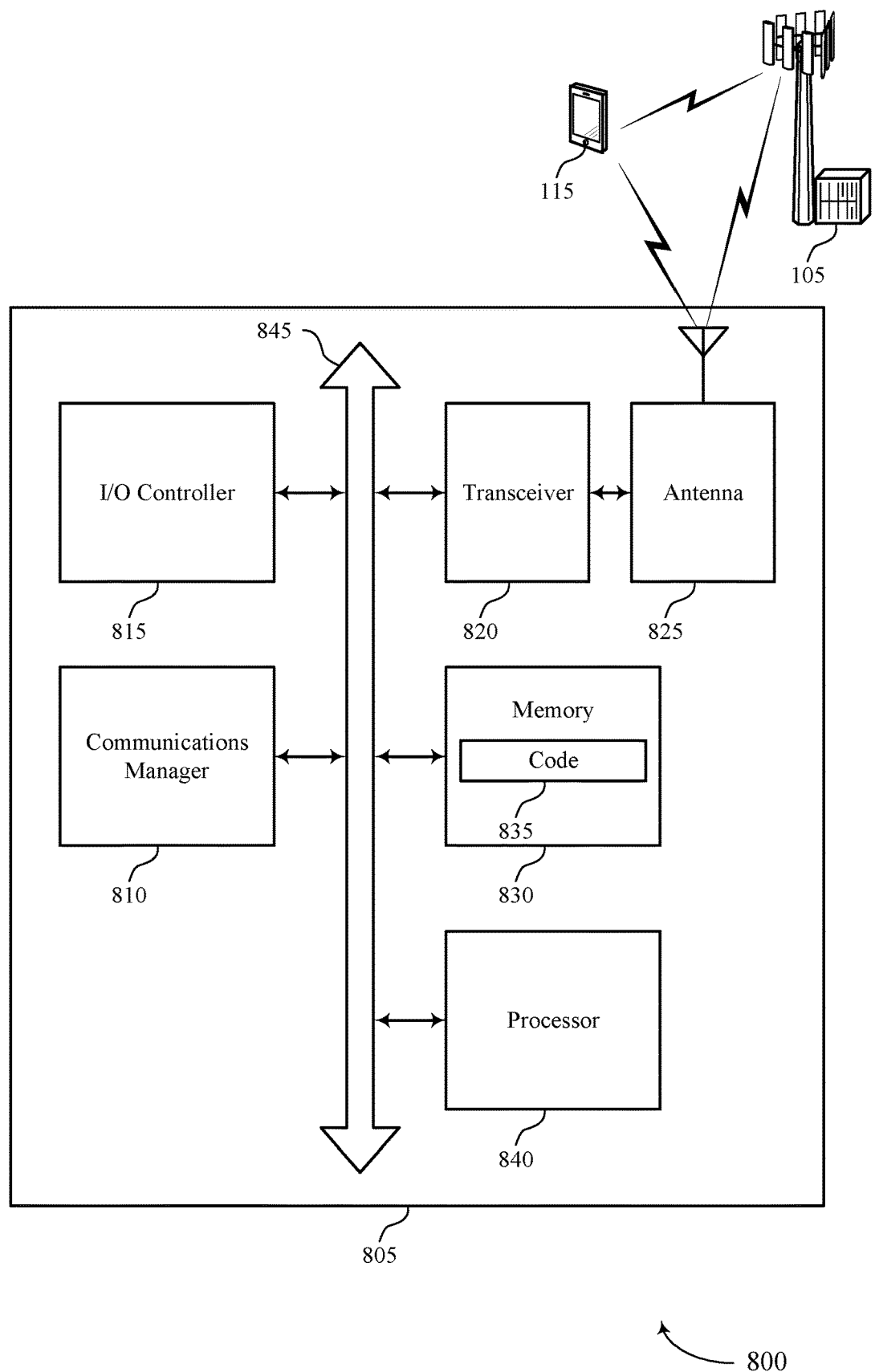
FIG. 8 shows a diagram of a system including a device that supports dynamic cyclic prefix selection in accordance with aspects of the present disclosure.

FIG. 8 shows a diagram of a system 800 including a device 805 that supports dynamic CP selection in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communications manager 810, an I/O controller 815, a transceiver 820, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In some other cases, the I/O controller 815 may represent or interact with a modem, a keyboard, a mouse, a touchscreen, or a similar device. In some cases, the I/O controller 815 may be implemented as part of a processor, such as the processor 840. In some cases, a user may interact with the device 805 via the I/O controller 815 or via hardware components controlled by the I/O controller 815.

In some cases, the device 805 may include a single antenna 825. However, in some other cases the device 805 may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic CP selection). For example, the device 805 or a component of the device 805 may include a processor 840 and memory 830 coupled to the processor 840, the processor 840 and memory 830 configured to perform various functions described herein.

The communications manager 810 may support wireless communication at a UE in accordance with examples as disclosed herein. For example, the communications manager 810 may be configured to provide or support a means for establishing a wireless connection with a base station. The communications manager 810 may be configured to provide or support a means for communicating with the base station on the wireless connection using a numerology and a first CP configuration associated with a first CP length. The communications manager 810 may be configured to provide or support a means for determining a second CP length for the numerology based on channel quality information for the wireless connection. The communications manager 810 may be configured to provide or support a means for transmitting, to the base station, an indication of the second CP length. The communications manager 810 may be configured to provide or support a means for receiving, based on transmitting the indication, downlink signals from the base station on the wireless connection using the numerology according to a second CP configuration associated with the second CP length.

In some examples, the communications manager 810 may be configured to perform various operations (e.g., receiving, monitoring, transmitting) using or otherwise in cooperation with the transceiver 820, the one or more antennas 825, or any combination thereof. Although the communications manager 810 is illustrated as a separate component, in some examples, one or more functions described with reference to the communications manager 810 may be supported by or performed by the processor 840, the memory 830, the code 835, or any combination thereof. For example, the code 835 may include instructions executable by the processor 840 to cause the device 805 to perform various aspects of dynamic CP selection as described herein, or the processor 840 and the memory 830 may be otherwise configured to perform or support such operations.

Figure 9:
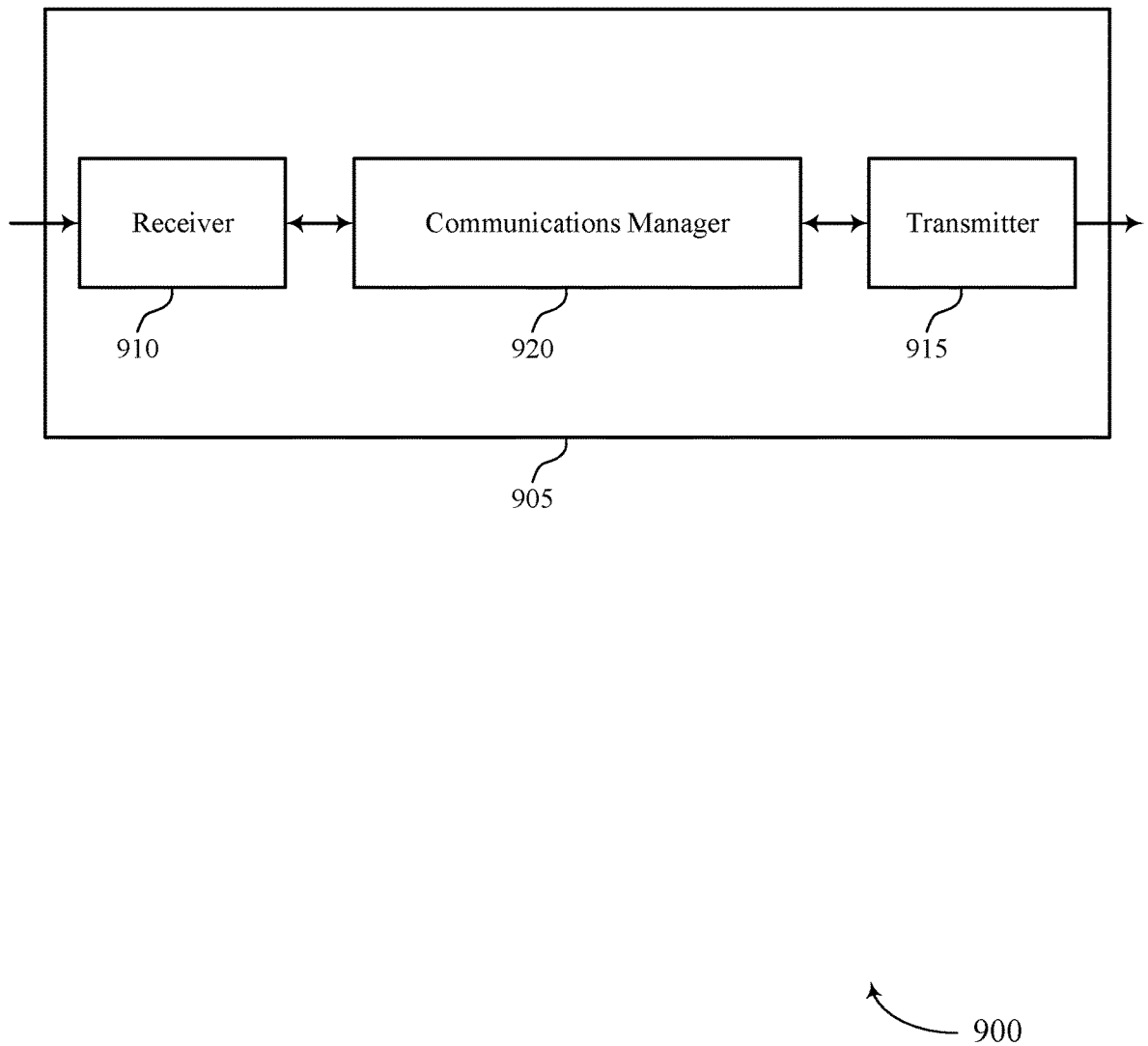
FIGS. 9 and 10 show block diagrams of devices that support dynamic cyclic prefix selection in accordance with aspects of the present disclosure.

FIG. 9 shows a block diagram 900 of a device 905 that supports dynamic CP selection in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic CP selection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to size-based neural network selection for autoencoder-based communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic CP selection as described herein.

In some examples, the communications manager 920, the receiver 910, the transmitter 915, or various combinations thereof or components thereof, may be implemented in hardware (e.g., in communications management circuitry). The circuitry may include a processor, an DSP, an ASIC, an FPGA or other programmable logic device, a discrete gate or transistor logic, discrete hardware components, or any combination thereof designed to perform the functions described in the present disclosure.

Additionally or alternatively, in some examples, the communications manager 920, the receiver 910, the transmitter 915, or various combinations thereof or components thereof, may be implemented in code (e.g., as communications management software or firmware) executed by a processor. If implemented in code executed by a processor, the functions of the communications manager 920, the receiver 910, the transmitter 915, or various combinations thereof or components thereof, may be executed by a general-purpose processor, a DSP, a CPU, an ASIC, an FPGA, or any combination of these or other programmable logic devices.

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured to provide or support a means for establishing a wireless connection with a UE. The communications manager 920 may be configured to provide or support a means for communicating with the UE on the wireless connection using a numerology and a first CP configuration associated with a first CP length. The communications manager 920 may be configured to provide or support a means for receiving, from the UE, an indication of a second CP length determined by the UE for the wireless connection and the numerology. The communications manager 920 may be configured to provide or support a means for transmitting, based on the indication, downlink signals to the UE on the wireless connection using the numerology according to a second CP configuration associated with the second CP length.

Figure 10:
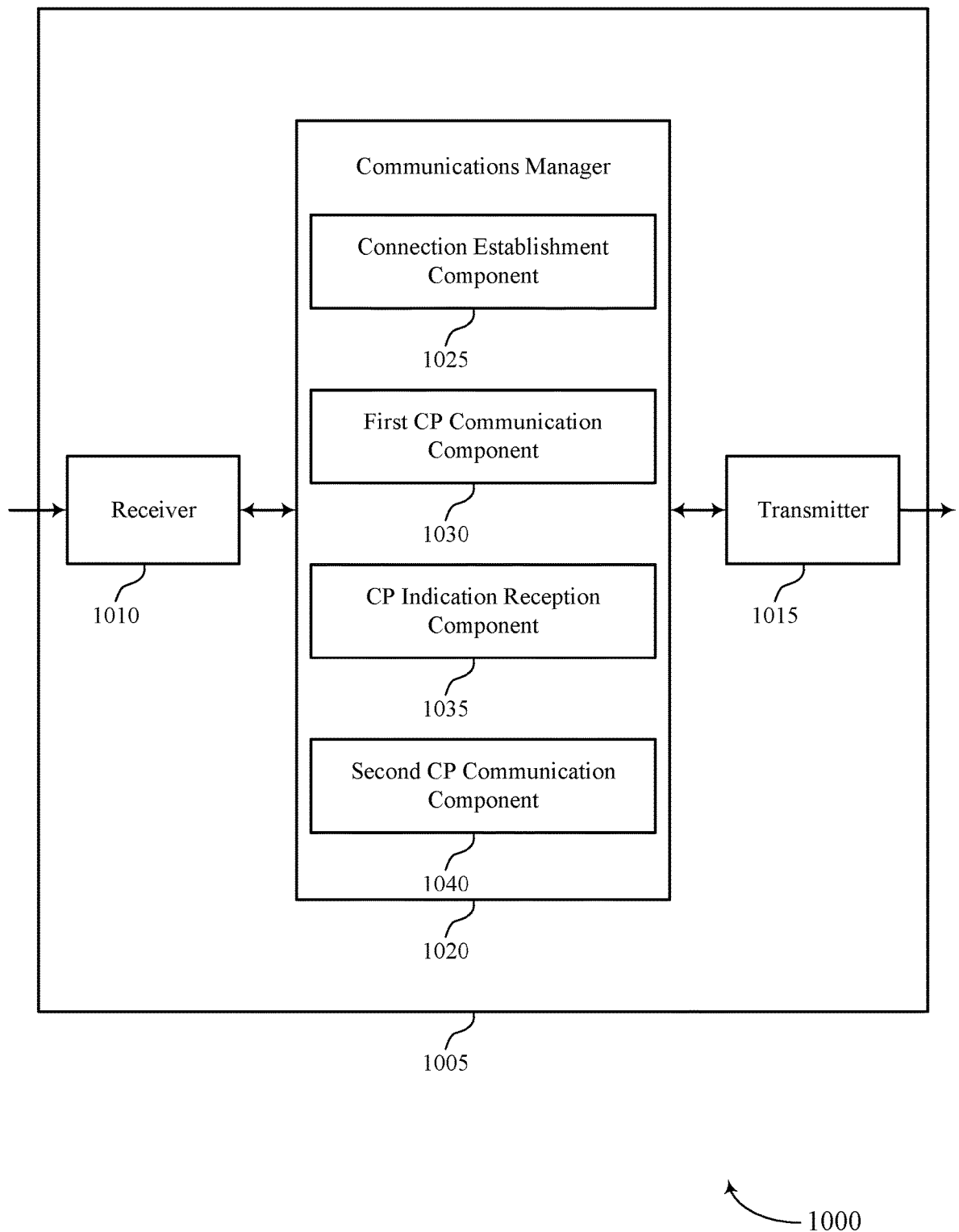

FIG. 10 shows a block diagram 1000 of a device 1005 that supports dynamic CP selection in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic CP selection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic CP selection as described herein. For example, the communications manager 1020 may include a connection establishment component 1025, a first CP communication component 1030, a CP indication reception component 1035, a second CP communication component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The connection establishment component 1025 may be configured to provide or support a means for establishing a wireless connection with a UE. The first CP communication component 1030 may be configured to provide or support a means for communicating with the UE on the wireless connection using a numerology and a first CP configuration associated with a first CP length. The CP indication reception component 1035 may be configured to provide or support a means for receiving, from the UE, an indication of a second CP length determined by the UE for the wireless connection and the numerology. The second CP communication component 1040 may be configured to provide or support a means for transmitting, based on the indication, downlink signals to the UE on the wireless connection using the numerology according to a second CP configuration associated with the second CP length.

Figure 11:
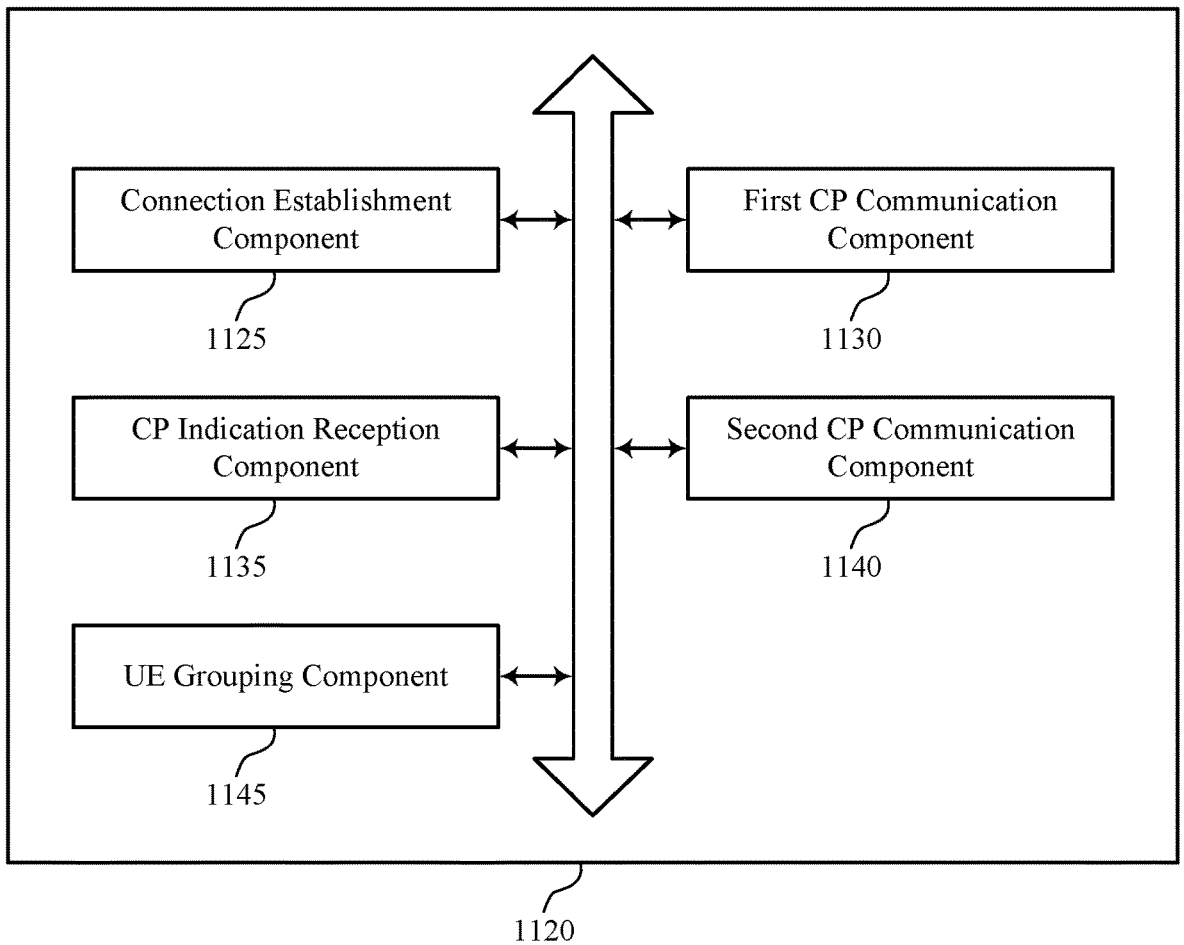
FIG. 11 shows a block diagram of a communications manager that supports dynamic cyclic prefix selection in accordance with aspects of the present disclosure.

FIG. 11 shows a block diagram 1100 of a communications manager 1120 that supports dynamic CP selection in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic CP selection as described herein. For example, the communications manager 1120 may include a connection establishment component 1125, a first CP communication component 1130, a CP indication reception component 1135, a second CP communication component 1140, a UE grouping component 1145, or any combination thereof. Each of these components may communicate, directly or indirectly, with one another (e.g., via one or more buses).

The communications manager 1120 may support wireless communication at a base station in accordance with examples as disclosed herein. The connection establishment component 1125 may be configured to provide or support a means for establishing a wireless connection with a UE. The first CP communication component 1130 may be configured to provide or support a means for communicating with the UE on the wireless connection using a numerology and a first CP configuration associated with a first CP length. The CP indication reception component 1135 may be configured to provide or support a means for receiving, from the UE, an indication of a second CP length determined by the UE for the wireless connection and the numerology. The second CP communication component 1140 may be configured to provide or support a means for transmitting, based on the indication, downlink signals to the UE on the wireless connection using the numerology according to a second CP configuration associated with the second CP length.

In some examples, to support receiving the indication, the CP indication reception component 1135 may be configured to provide or support a means for receiving the indication in at least a CSI report, or a beam management report, or a report different from the CSI report and the beam management report, or any combination thereof. In some examples, the CP indication reception component 1135 may be configured to provide or support a means for transmitting, to the UE, a configuration indicating the set of CP lengths.

In some examples, the CP indication reception component 1135 may be configured to provide or support a means for transmitting, to the UE at least in part in response to the indication of the second CP length, an acknowledgement of the second CP length for the downlink signals.

In some examples, the CP indication reception component 1135 may be configured to provide or support a means for transmitting one or more CSI-RSs according to a configuration for CSI-RS measurements, where the second CP length is based on the one or more CSI-RSs. In some examples, the configuration for CSI-RS measurements is associated with a CSI procedure, or a beam management procedure, or any combination thereof.

In some examples, the second CP communication component 1140 may be configured to provide or support a means for determining that a first time period for the first CP configuration has elapsed before determining to transmit the downlink signals to the UE according to the second CP configuration. In some examples, the second CP communication component 1140 may be configured to provide or support a means for starting a timer based on receiving the indication of the second CP length, where determining that the first time period has elapsed is based on starting the timer. In some examples, the second CP length includes one CP length of a set of CP lengths configured for the UE. In some examples, the second CP length is shorter than the first CP length.

In some examples, the UE grouping component 1145 may be configured to provide or support a means for identifying a group of UEs that includes the UE, each UE of the group of UEs associated with a same CP length for downlink signals. In some examples, the UE grouping component 1145 may be configured to provide or support a means for communicating with the group of UEs using a FDM scheme that is based on identifying the group of UEs that are associated with the same CP length.

Figure 12:
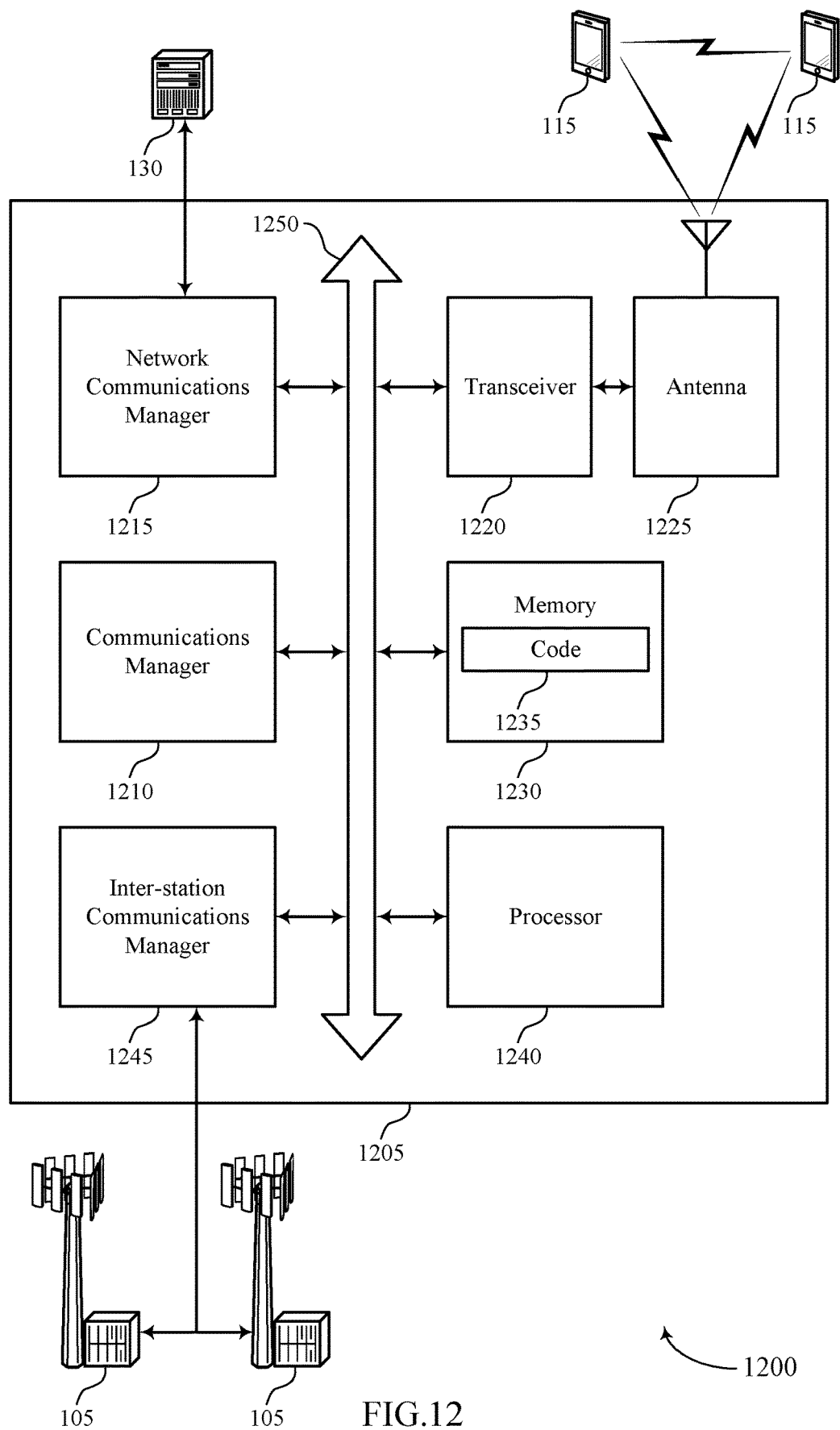
FIG. 12 shows a diagram of a system including a device that supports dynamic cyclic prefix selection in accordance with aspects of the present disclosure.

FIG. 12 shows a diagram of a system 1200 including a device 1205 that supports dynamic CP selection in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, including a communications manager 1210, a network communications manager 1215, a transceiver 1220, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1215 may manage communications with a core network (e.g., via one or more wired backhaul links). For example, the network communications manager 1215 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1220 may communicate bi-directionally, via the one or more antennas 1225, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to one or more antennas 1225 for transmission, and to demodulate packets received from the one or more antennas 1225. The transceiver 1220, or the transceiver 1220 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic CP selection). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1210 may support wireless communication at a base station in accordance with examples as disclosed herein. For example, the communications manager 1210 may be configured to provide or support a means for establishing a wireless connection with a UE. The communications manager 1210 may be configured to provide or support a means for communicating with the UE on the wireless connection using a numerology and a first CP configuration associated with a first CP length. The communications manager 1210 may be configured to provide or support a means for receiving, from the UE, an indication of a second CP length determined by the UE for the wireless connection and the numerology. The communications manager 1210 may be configured to provide or support a means for transmitting, based on the indication, downlink signals to the UE on the wireless connection using the numerology according to a second CP configuration associated with the second CP length.

In some examples, the communications manager 1210 may be configured to perform various operations (e.g., receiving, monitoring, transmitting) using or otherwise in cooperation with the transceiver 1220, the one or more antennas 1225, or any combination thereof. Although the communications manager 1210 is illustrated as a separate component, in some examples, one or more functions described with reference to the communications manager 1210 may be supported by or performed by the processor 1240, the memory 1230, the code 1235, or any combination thereof. For example, the code 1235 may include instructions executable by the processor 1240 to cause the device 1205 to perform various aspects of dynamic CP selection as described herein, or the processor 1240 and the memory 1230 may be otherwise configured to perform or support such operations.

Figure 13:
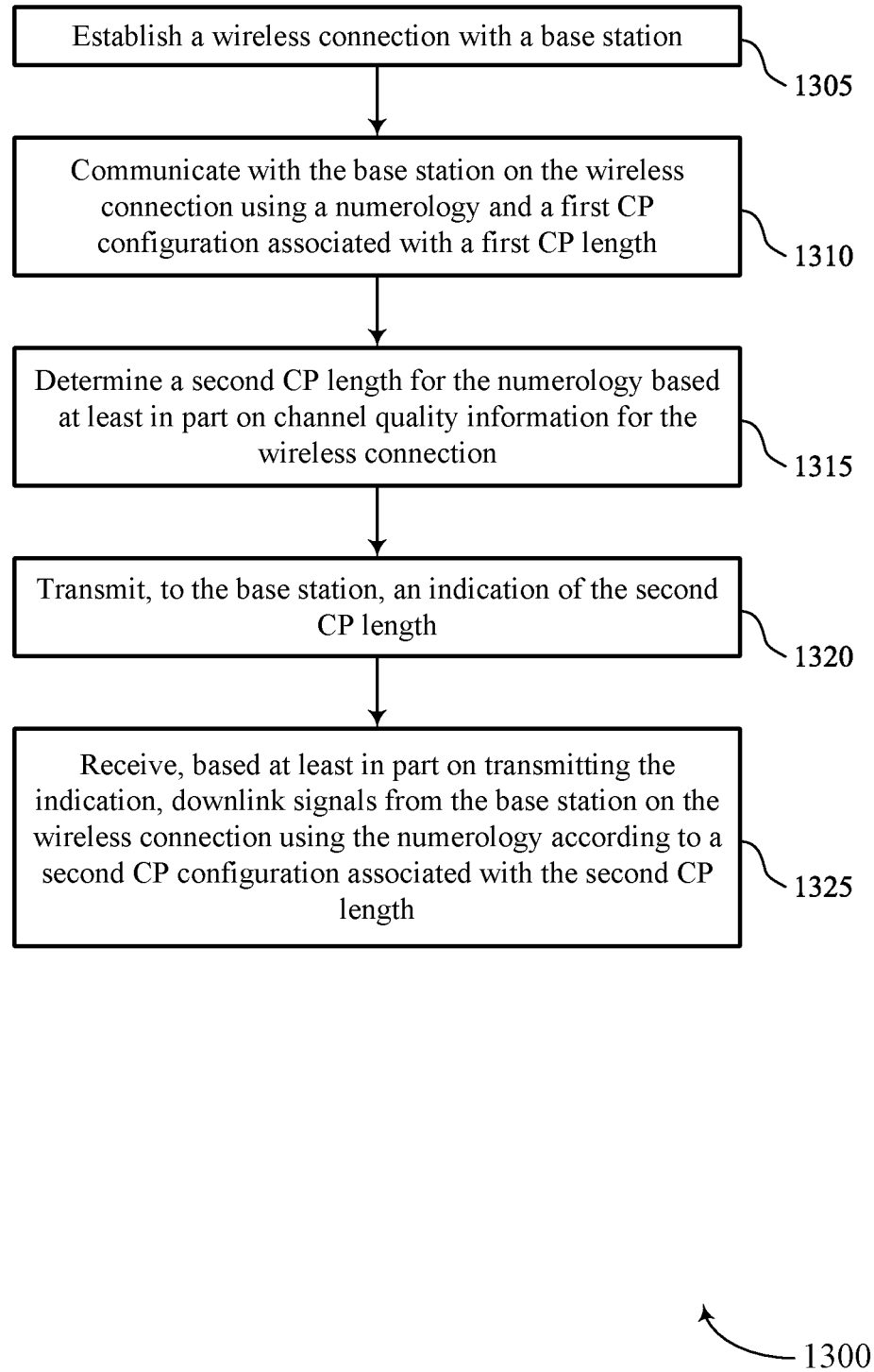
FIGS. 13 through 16 show flowcharts illustrating methods that support dynamic cyclic prefix selection in accordance with aspects of the present disclosure.

FIG. 13 shows a flowchart illustrating a method 1300 that supports dynamic CP selection in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include establishing a wireless connection with a base station. The operations of 1305 may be performed according to the methods described herein. In some examples, aspects of the operations of 1305 may be performed by a connection establishment component 725 as described with reference to FIG. 7.

At 1310, the method may include communicating with the base station on the wireless connection using a numerology and a first CP configuration associated with a first CP length. The operations of 1310 may be performed according to the methods described herein. In some examples, aspects of the operations of 1310 may be performed by a first CP configuration component 730 as described with reference to FIG. 7.

At 1315, the method may include determining a second CP length for the numerology based on channel quality information for the wireless connection. The operations of 1315 may be performed according to the methods described herein. In some examples, aspects of the operations of 1315 may be performed by a second CP determination component 735 as described with reference to FIG. 7.

At 1320, the method may include transmitting, to the base station, an indication of the second CP length. The operations of 1320 may be performed according to the methods described herein. In some examples, aspects of the operations of 1320 may be performed by a CP indication component 740 as described with reference to FIG. 7.

At 1325, the method may include receiving, based on transmitting the indication, downlink signals from the base station on the wireless connection using the numerology according to a second CP configuration associated with the second CP length. The operations of 1325 may be performed according to the methods described herein. In some examples, aspects of the operations of 1325 may be performed by a second CP configuration component 745 as described with reference to FIG. 7.

Figure 14:
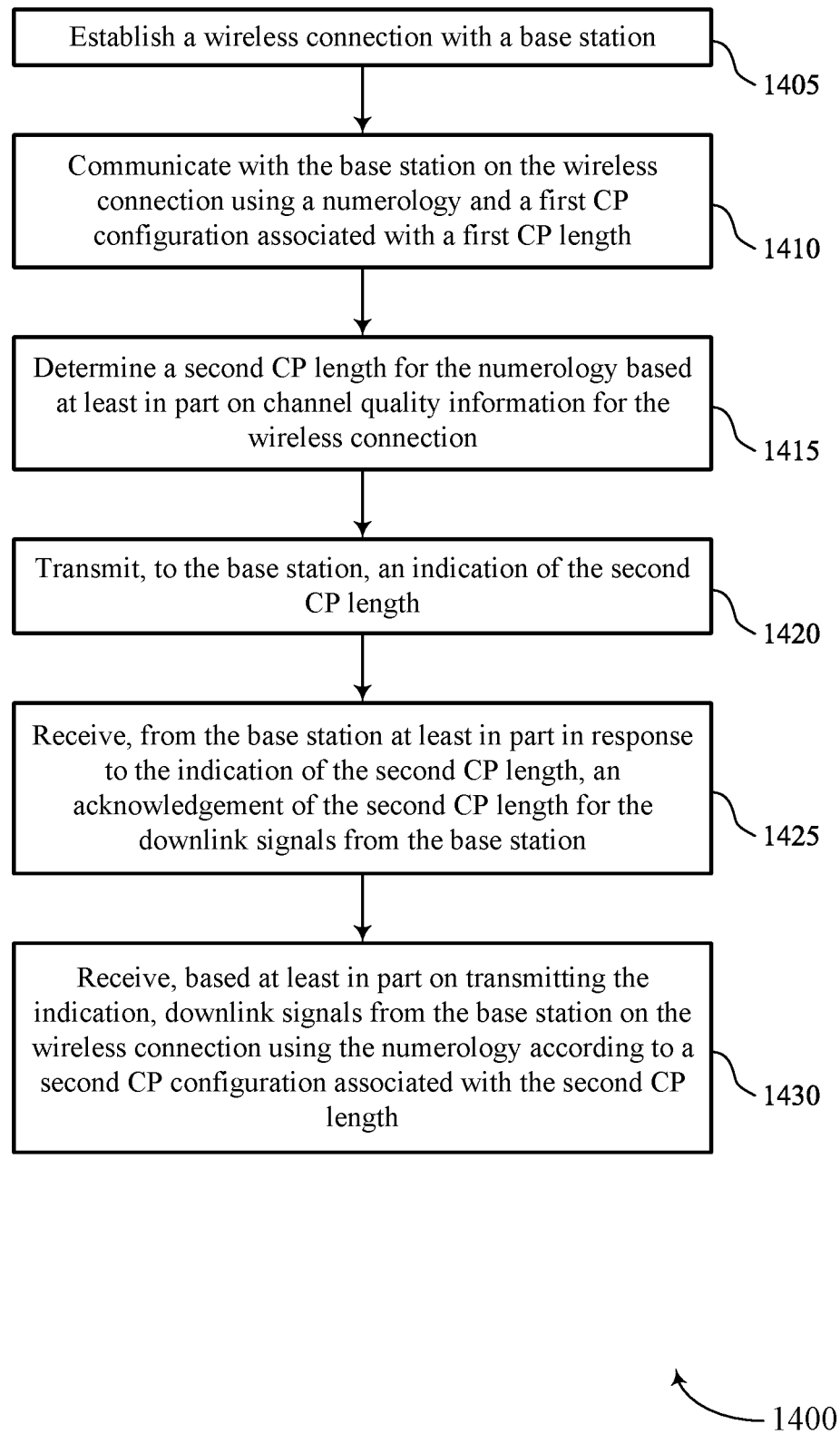

FIG. 14 shows a flowchart illustrating a method 1400 that supports dynamic CP selection in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include establishing a wireless connection with a base station. The operations of 1405 may be performed according to the methods described herein. In some examples, aspects of the operations of 1405 may be performed by a connection establishment component 725 as described with reference to FIG. 7.

At 1410, the method may include communicating with the base station on the wireless connection using a numerology and a first CP configuration associated with a first CP length. The operations of 1410 may be performed according to the methods described herein. In some examples, aspects of the operations of 1410 may be performed by a first CP configuration component 730 as described with reference to FIG. 7.

At 1415, the method may include determining a second CP length for the numerology based on channel quality information for the wireless connection. The operations of 1415 may be performed according to the methods described herein. In some examples, aspects of the operations of 1415 may be performed by a second CP determination component 735 as described with reference to FIG. 7.

At 1420, the method may include transmitting, to the base station, an indication of the second CP length. The operations of 1420 may be performed according to the methods described herein. In some examples, aspects of the operations of 1420 may be performed by a CP indication component 740 as described with reference to FIG. 7.

At 1425, the method may include receiving, from the base station at least in part in response to the indication of the second CP length, an acknowledgement of the second CP length for the downlink signals from the base station. The operations of 1425 may be performed according to the methods described herein. In some examples, aspects of the operations of 1425 may be performed by a CP indication component 740 as described with reference to FIG. 7.

At 1430, the method may include receiving, based on transmitting the indication, downlink signals from the base station on the wireless connection using the numerology according to a second CP configuration associated with the second CP length. The operations of 1430 may be performed according to the methods described herein. In some examples, aspects of the operations of 1430 may be performed by a second CP configuration component 745 as described with reference to FIG. 7.

Figure 15:
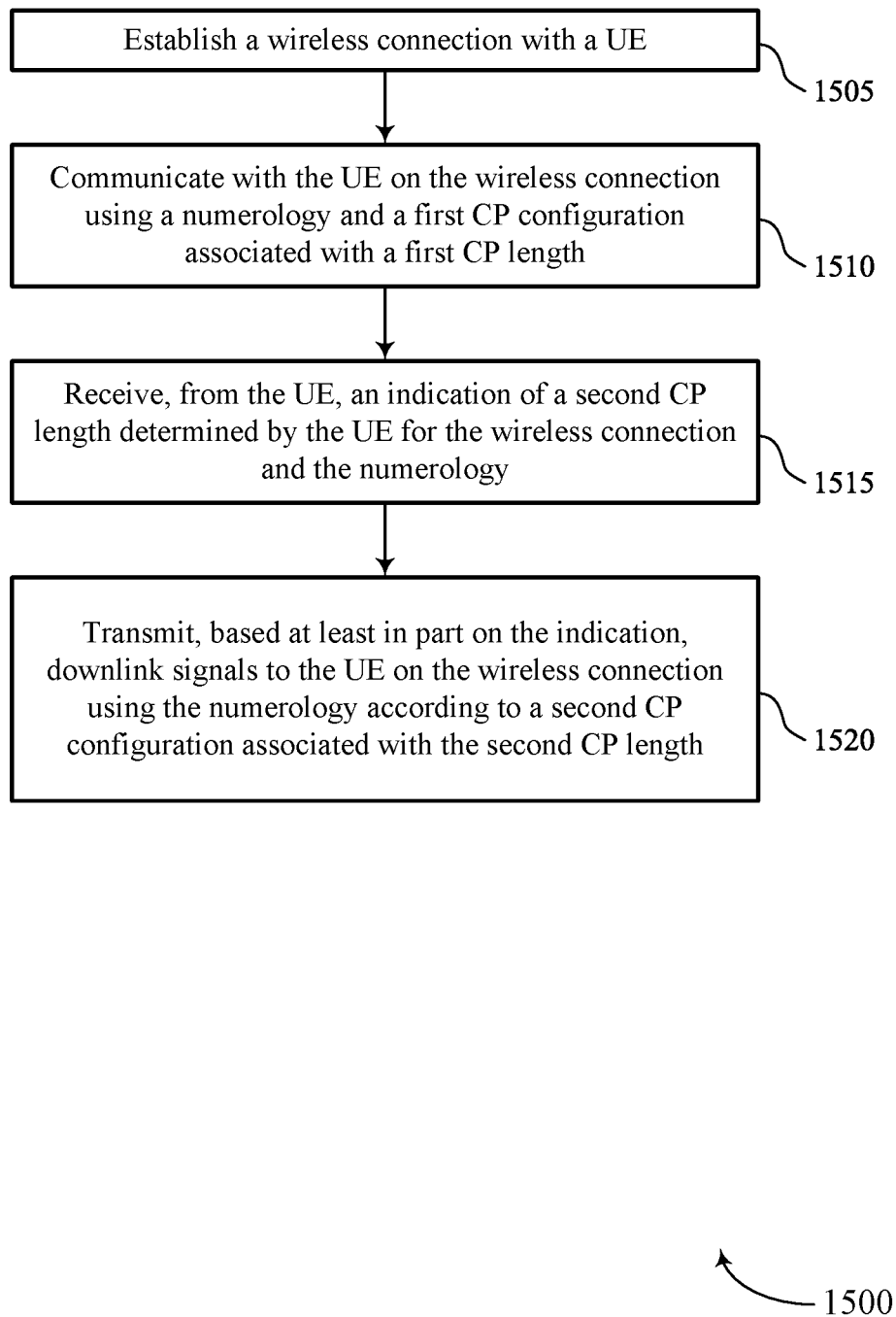

FIG. 15 shows a flowchart illustrating a method 1500 that supports dynamic CP selection in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include establishing a wireless connection with a UE. The operations of 1505 may be performed according to the methods described herein. In some examples, aspects of the operations of 1505 may be performed by a connection establishment component 1125 as described with reference to FIG. 11.

At 1510, the method may include communicating with the UE on the wireless connection using a numerology and a first CP configuration associated with a first CP length. The operations of 1510 may be performed according to the methods described herein. In some examples, aspects of the operations of 1510 may be performed by a first CP communication component 1130 as described with reference to FIG. 11.

At 1515, the method may include receiving, from the UE, an indication of a second CP length determined by the UE for the wireless connection and the numerology. The operations of 1515 may be performed according to the methods described herein. In some examples, aspects of the operations of 1515 may be performed by a CP indication reception component 1135 as described with reference to FIG. 11.

At 1520, the method may include transmitting, based on the indication, downlink signals to the UE on the wireless connection using the numerology according to a second CP configuration associated with the second CP length. The operations of 1520 may be performed according to the methods described herein. In some examples, aspects of the operations of 1520 may be performed by a second CP communication component 1140 as described with reference to FIG. 11.

Figure 16:
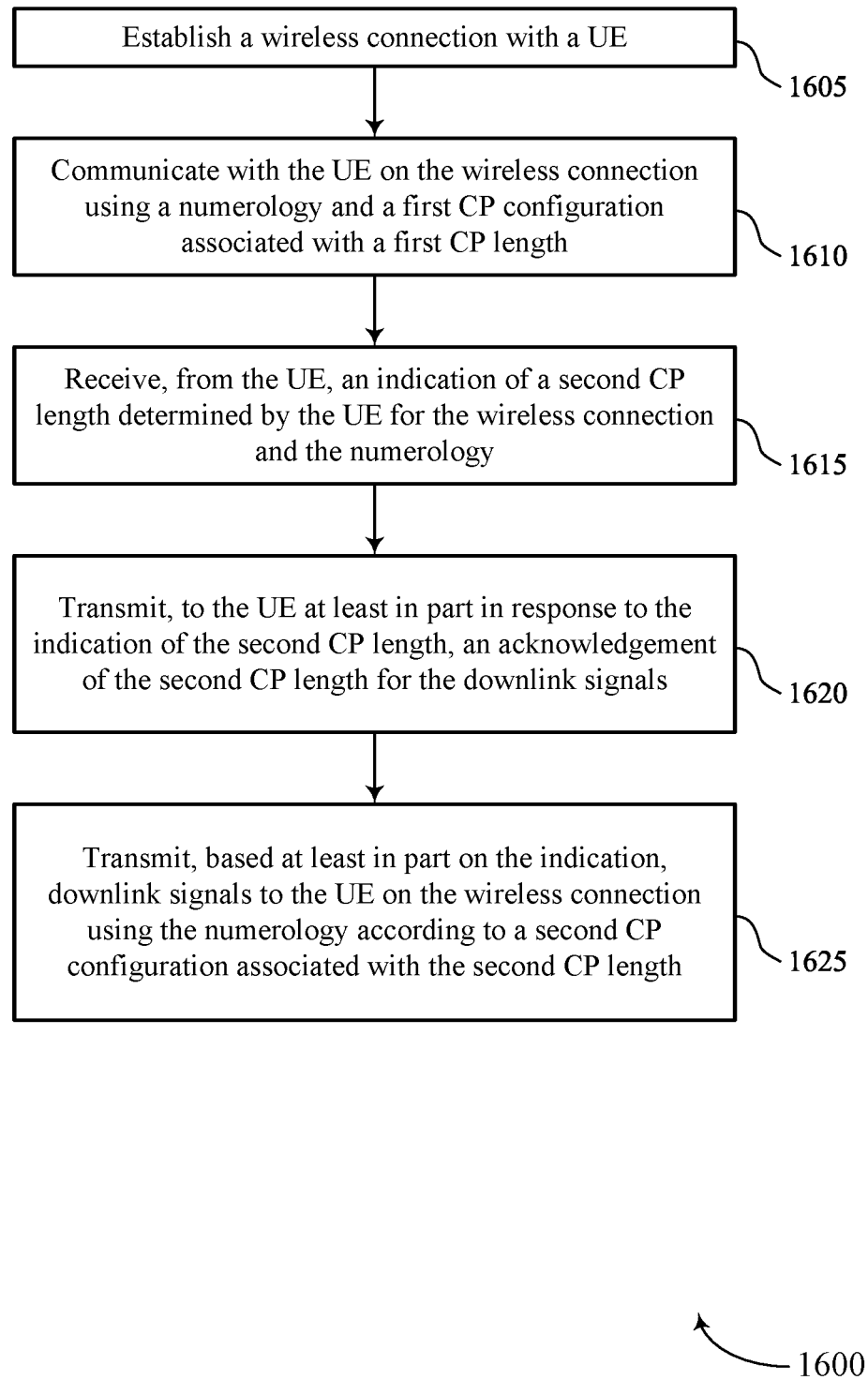

FIG. 16 shows a flowchart illustrating a method 1600 that supports dynamic CP selection in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include establishing a wireless connection with a UE. The operations of 1605 may be performed according to the methods described herein. In some examples, aspects of the operations of 1605 may be performed by a connection establishment component 1125 as described with reference to FIG. 11.

At 1610, the method may include communicating with the UE on the wireless connection using a numerology and a first CP configuration associated with a first CP length. The operations of 1610 may be performed according to the methods described herein. In some examples, aspects of the operations of 1610 may be performed by a first CP communication component 1130 as described with reference to FIG. 11.

At 1615, the method may include receiving, from the UE, an indication of a second CP length determined by the UE for the wireless connection and the numerology. The operations of 1615 may be performed according to the methods described herein. In some examples, aspects of the operations of 1615 may be performed by a CP indication reception component 1135 as described with reference to FIG. 11.

At 1620, the method may include transmitting, to the UE at least in part in response to the indication of the second CP length, an acknowledgement of the second CP length for the downlink signals. The operations of 1620 may be performed according to the methods described herein. In some examples, aspects of the operations of 1620 may be performed by a CP indication reception component 1135 as described with reference to FIG. 11.

At 1625, the method may include transmitting, based on the indication, downlink signals to the UE on the wireless connection using the numerology according to a second CP configuration associated with the second CP length. The operations of 1625 may be performed according to the methods described herein. In some examples, aspects of the operations of 1625 may be performed by a second CP communication component 1140 as described with reference to FIG. 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a wireless connection with a base station;
    communicating with the base station via the wireless connection using a numerology and a first cyclic prefix configuration associated with a first cyclic prefix length;
    determining a second cyclic prefix length for the numerology based at least in part on channel quality information for the wireless connection;
    transmitting, to the base station, an indication of the second cyclic prefix length for the numerology; and
    receiving, based at least in part on transmitting the indication, downlink signals from the base station via the wireless connection using the numerology according to a second cyclic prefix configuration associated with the second cyclic prefix length.

2. The method of claim 1, wherein transmitting the indication comprises:
    transmitting the indication in a channel state information report, or a beam management report, or a report different from the channel state information report and the beam management report, or any combination thereof.

3. The method of claim 1, further comprising:
    determining that a first time period for the first cyclic prefix configuration has elapsed before determining to receive the downlink signals from the base station according to the second cyclic prefix configuration.

4. The method of claim 3, further comprising:
    starting a timer based at least in part on transmitting the indication of the second cyclic prefix length, wherein determining that the first time period has elapsed is based at least in part on starting the timer.

5. The method of claim 1, wherein determining the second cyclic prefix length comprises:
    selecting the second cyclic prefix length from a set of cyclic prefix lengths configured at the UE.

6. The method of claim 5, further comprising:
    receiving, from the base station, a configuration indicating the set of cyclic prefix lengths, wherein selecting the second cyclic prefix length from the set of cyclic prefix lengths is based at least in part on the configuration indicating the set of cyclic prefix lengths.

7. The method of claim 1, further comprising:
    receiving, from the base station, at least in part in response to the indication of the second cyclic prefix length, an acknowledgement of the second cyclic prefix length for the downlink signals from the base station.

8. The method of claim 1, wherein determining the second cyclic prefix length comprises:
    determining a channel impulse response associated with the wireless connection based at least in part on one or more measurements of signals received on the wireless connection;
    determining a delay spread associated with the wireless connection based at least in part on the channel impulse response, the channel quality information comprising the delay spread; and
    setting the second cyclic prefix length to be greater than or equal to the delay spread.

9. The method of claim 1, wherein determining the second cyclic prefix length comprises:
    determining, for the wireless connection, one or more of a signal to noise ratio, an inter-symbol interference, a thermal noise, or an interference based at least in part on one or more measurements of signals received on the wireless connection; and
    identifying the second cyclic prefix length based at least in part on the one or more of the signal to noise ratio, the inter-symbol interference, the thermal noise, or the interference.

10. The method of claim 9, further comprising:
    determining that a magnitude of an effect of the inter-symbol interference on the signal to noise ratio is below a predetermined threshold, the second cyclic prefix length identified based at least in part on the magnitude of the effect being below the predetermined threshold.

11. The method of claim 1, further comprising:
receiving one or more channel state information reference signals according to a configuration for channel state information reference signal measurements; and
determining the channel quality information based at least in part on the one or more channel state information reference signals.

12. The method of claim 11, wherein the configuration for channel state information reference signal measurements is associated with a channel state information procedure, or a beam management procedure, or any combination thereof.

13. The method of claim 1, further comprising:
performing one or more beam management procedures to select one or more beam parameters, wherein determining the second cyclic prefix length is further based at least in part on the one or more beam parameters.

14. The method of claim 1, wherein the second cyclic prefix length is shorter than the first cyclic prefix length.

15. A method for wireless communication at a base station, comprising:
establishing a wireless connection with a user equipment (UE);
communicating with the UE via the wireless connection using a numerology and a first cyclic prefix configuration associated with a first cyclic prefix length;
receiving an indication of a second cyclic prefix length determined by the UE for the wireless connection and the numerology; and
transmitting, based at least in part on the indication, downlink signals for the UE via the wireless connection using the numerology according to a second cyclic prefix configuration associated with the second cyclic prefix length.

16. The method of claim 15, wherein receiving the indication comprises:
receiving the indication in at least a channel state information report, or a beam management report, or a report different from the channel state information report and the beam management report, or any combination thereof.

17. The method of claim 15, further comprising:
determining that a first time period for the first cyclic prefix configuration has elapsed before determining to transmit the downlink signals to the UE according to the second cyclic prefix configuration.

18. The method of claim 17, further comprising:
starting a timer based at least in part on receiving the indication of the second cyclic prefix length, wherein determining that the first time period has elapsed is based at least in part on starting the timer.

19. The method of claim 15, wherein the second cyclic prefix length comprises one cyclic prefix length of a set of cyclic prefix lengths configured for the UE.

20. The method of claim 19, further comprising:
transmitting, to the UE, a configuration indicating the set of cyclic prefix lengths.

21. The method of claim 15, further comprising:
transmitting, to the UE at least in part in response to the indication of the second cyclic prefix length, an acknowledgement of the second cyclic prefix length for the downlink signals.

22. The method of claim 15, further comprising:
transmitting one or more channel state information reference signals according to a configuration for channel state information reference signal measurements, wherein the second cyclic prefix length is based at least in part on the one or more channel state information reference signals.

23. The method of claim 22, wherein the configuration for channel state information reference signal measurements is associated with a channel state information procedure, or a beam management procedure, or any combination thereof.

24. The method of claim 15, further comprising:
identifying a group of UEs that comprises the UE, each UE of the group of UEs associated with a same cyclic prefix length for downlink signals; and
communicating with the group of UEs using a frequency division multiplexing scheme that is based at least in part on identifying the group of UEs that are associated with the same cyclic prefix length.

25. The method of claim 15, wherein the second cyclic prefix length is shorter than the first cyclic prefix length.

26. An apparatus for wireless communication at a user equipment (UE), comprising:
a processor;
memory coupled with the processor; and
instructions stored in the memory and executable by the processor to cause the apparatus to:
establish a wireless connection with a base station;
communicate with the base station via the wireless connection using a numerology and a first cyclic prefix configuration associated with a first cyclic prefix length;
determine a second cyclic prefix length for the numerology based at least in part on channel quality information for the wireless connection;
transmit, to the base station, an indication of the second cyclic prefix length; and
receive, based at least in part on transmitting the indication, downlink signals from the base station on the wireless connection using the numerology according to a second cyclic prefix configuration associated with the second cyclic prefix length.

27. The apparatus of claim 26, wherein the instructions to transmit the indication are executable by the processor to cause the apparatus to:
transmit the indication in a channel state information report, or a beam management report, or a report different from the channel state information report and the beam management report, or any combination thereof.

28. The apparatus of claim 26, wherein the instructions are further executable by the processor to cause the apparatus to:
determine that a first time period for the first cyclic prefix configuration has elapsed before determining to receive the downlink signals from the base station according to the second cyclic prefix configuration.

29. The apparatus of claim 28, wherein the instructions are further executable by the processor to cause the apparatus to:
start a timer based at least in part on transmitting the indication of the second cyclic prefix length, wherein determining that the first time period has elapsed is based at least in part on starting the timer.

30. An apparatus for wireless communication at a base station, comprising:
a processor;
memory coupled with the processor; and
instructions stored in the memory and executable by the processor to cause the apparatus to:

establish a wireless connection with a user equipment (UE);
communicate with the UE via the wireless connection using a numerology and a first cyclic prefix configuration associated with a first cyclic prefix length;
receive an indication of a second cyclic prefix length determined by the UE for the wireless connection and the numerology; and
transmit, based at least in part on the indication, downlink signals for the UE via the wireless connection using the numerology according to a second cyclic prefix configuration associated with the second cyclic prefix length.

* * * * *